May 5, 1942.  E. S. HINELINE  2,282,284
REFLEX CAMERA
Original Filed Aug. 5, 1939  12 Sheets-Sheet 1
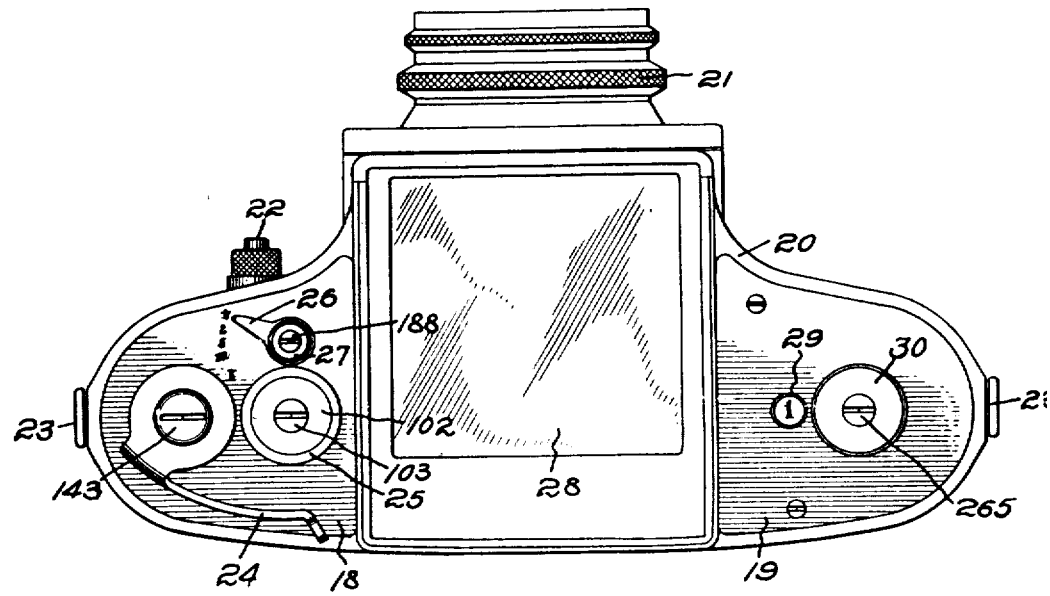
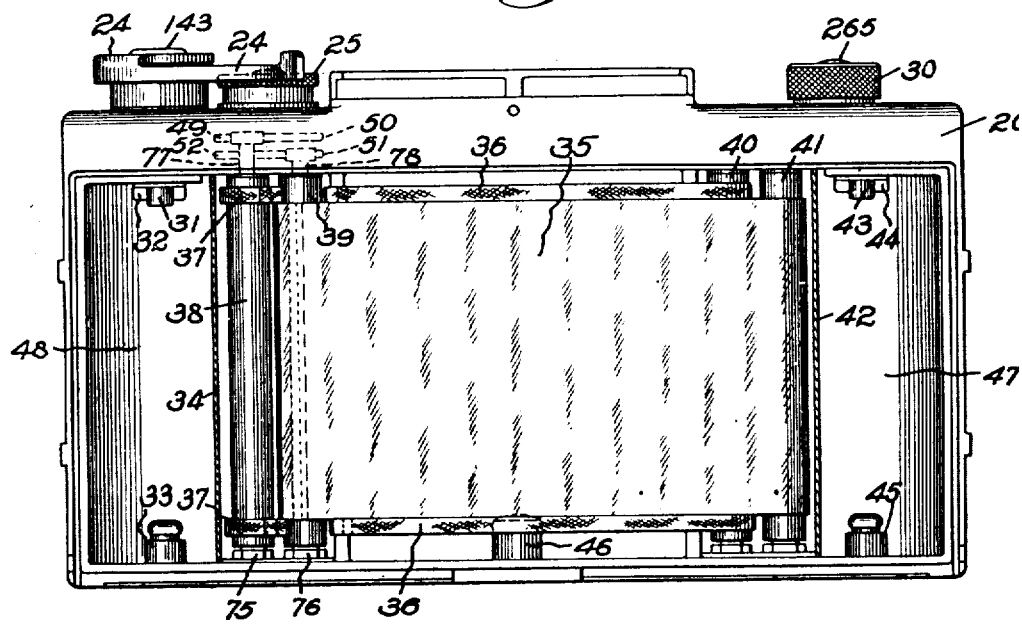
Inventor:
Edson S. Hineline, May 5, 1942.  E. S. HINELINE  2,282,284
REFLEX CAMERA
Original Filed Aug. 5, 1939   12 Sheets-Sheet 2
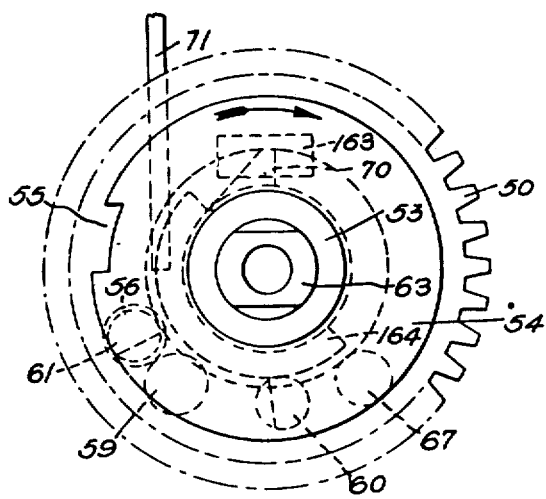
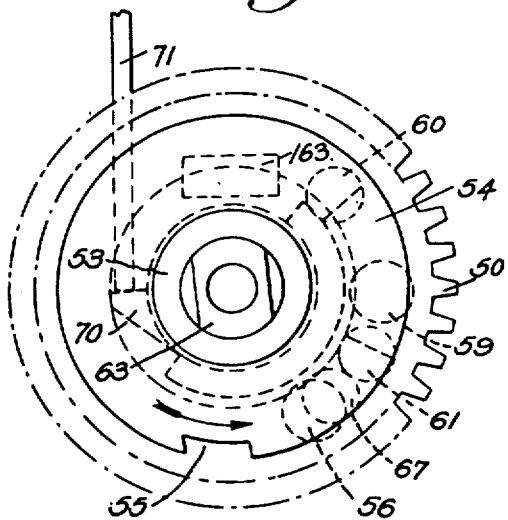
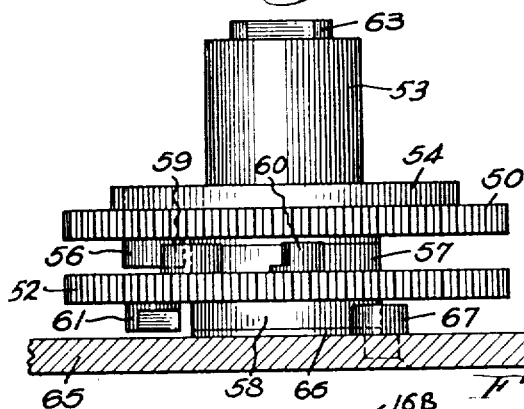
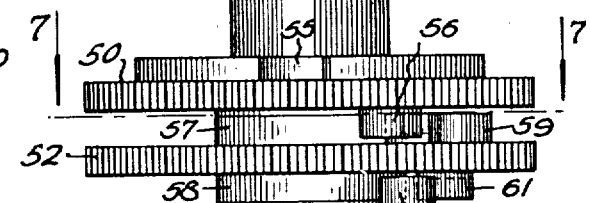
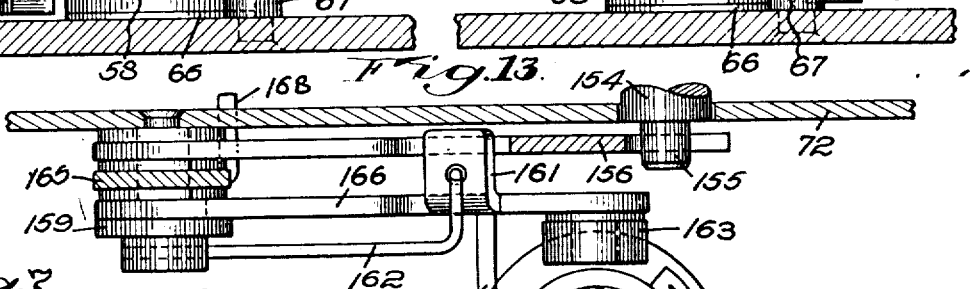
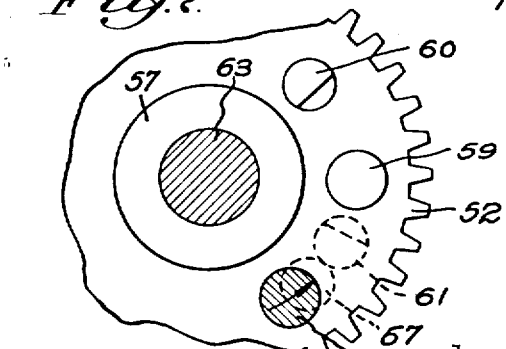
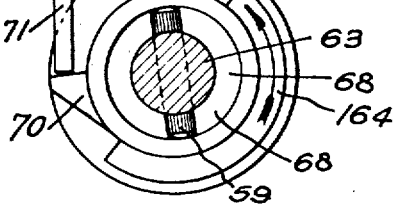
Inventor:
Edson S. Hineline,
by [signature] Attys May 5, 1942.  E. S. HINELINE  2,282,284
REFLEX CAMERA
Original Filed Aug. 5, 1939   12 Sheets-Sheet 3
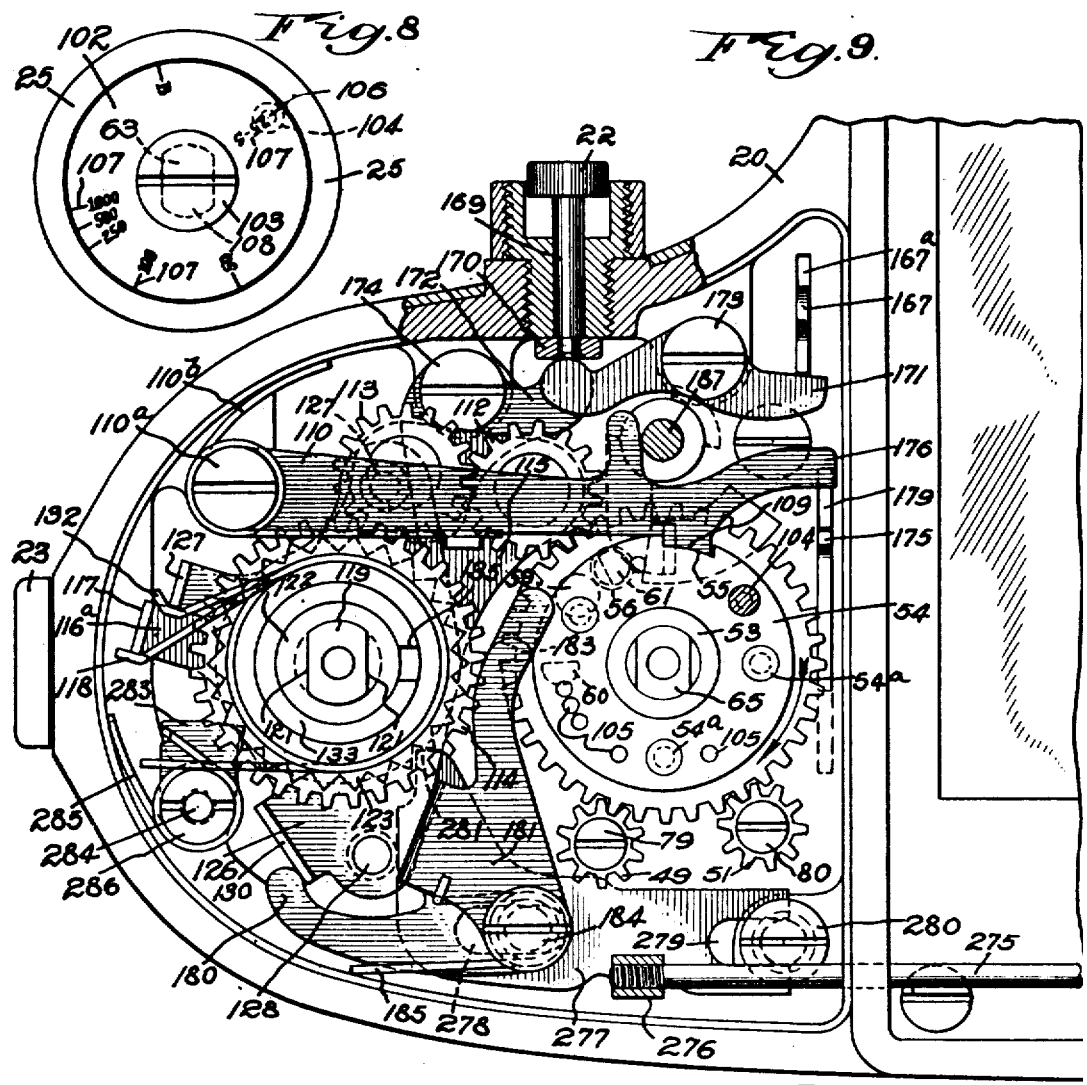
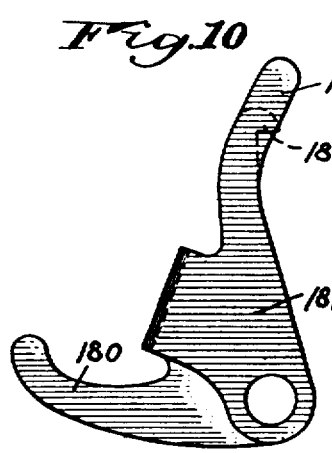
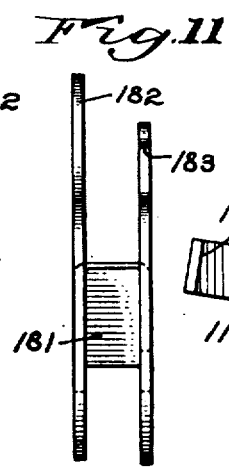
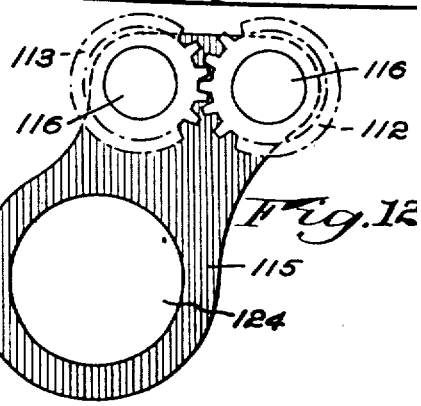
Inventor:
Edson S. Hineline May 5, 1942.  E. S. HINELINE  2,282,284
REFLEX CAMERA
Original Filed Aug. 5, 1939   12 Sheets—Sheet 4
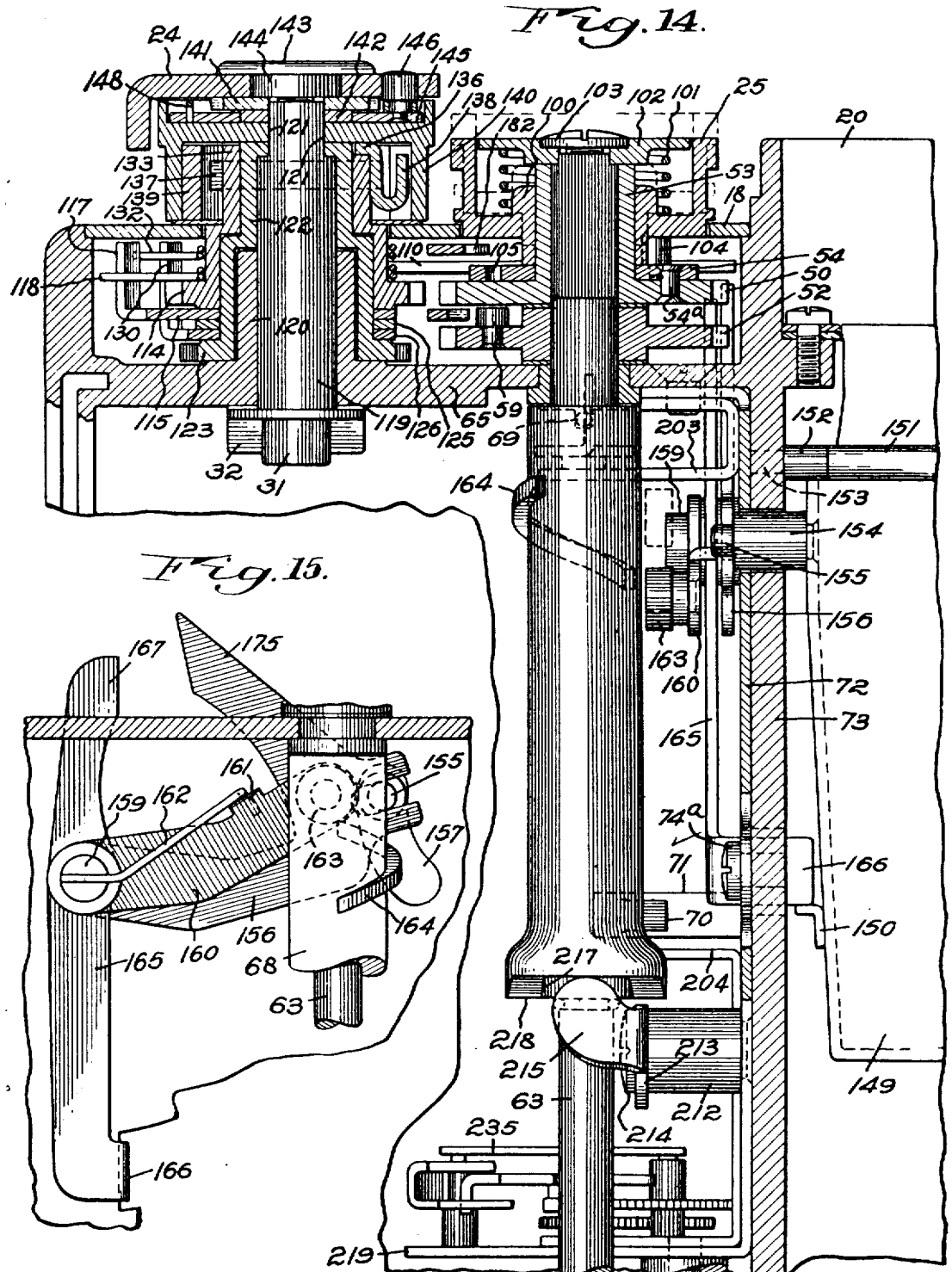
Inventor:
Edson S. Hineline,
by Emery, Booth, Townsend, Miller & Leichen
Attys.

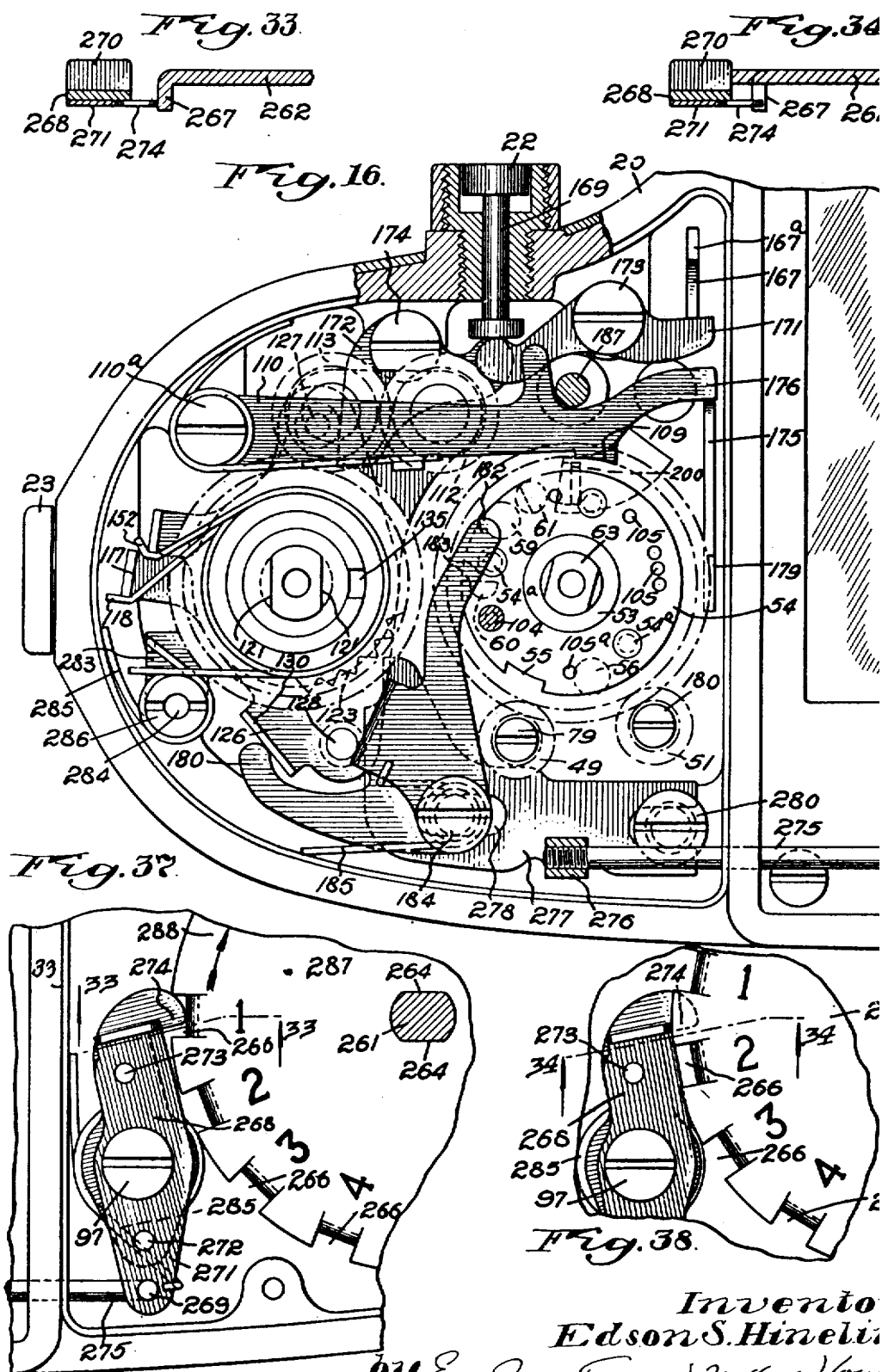

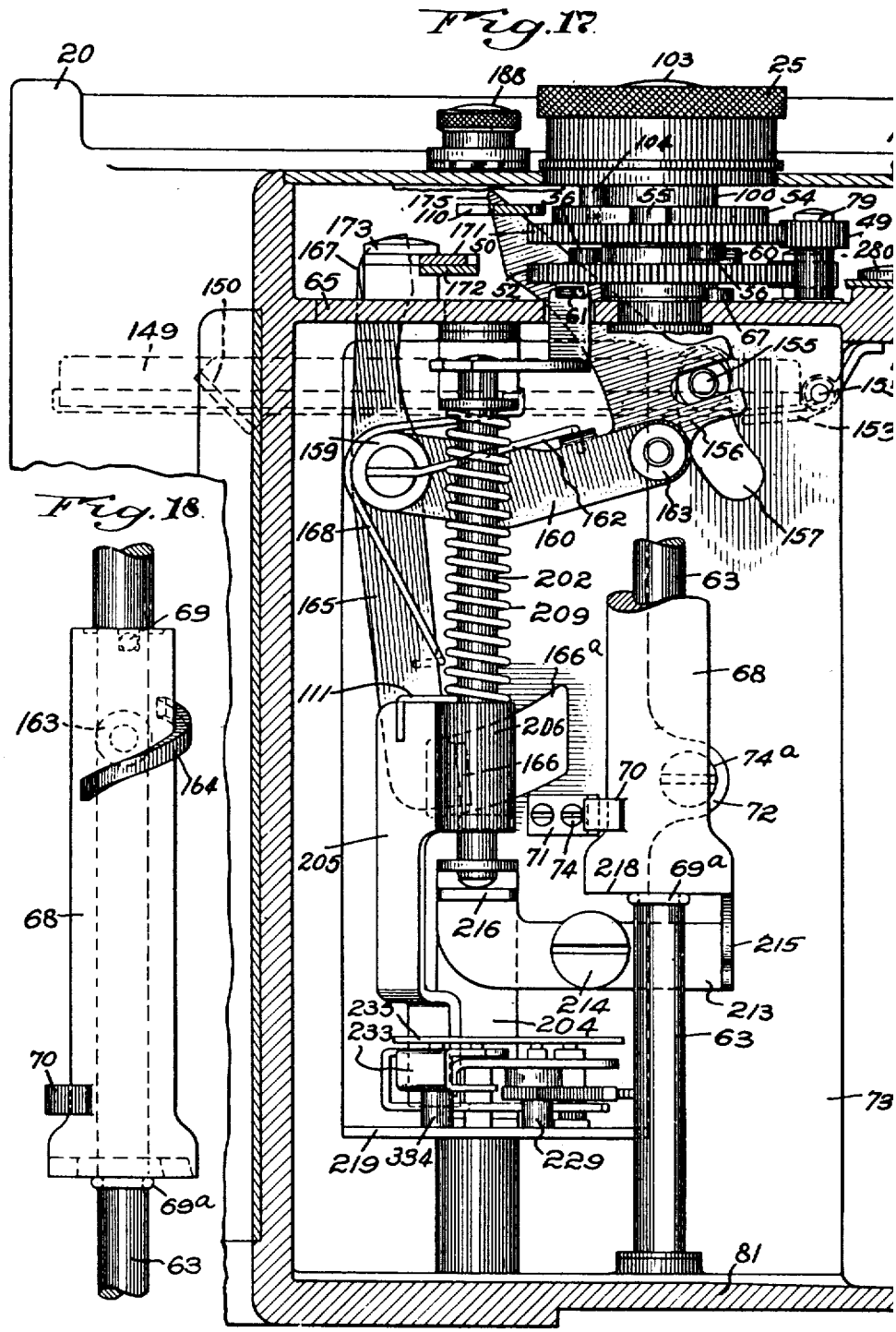

May 5, 1942.  E. S. HINELINE  2,282,284
REFLEX CAMERA
Original Filed Aug. 5, 1939   12 Sheets-Sheet 7
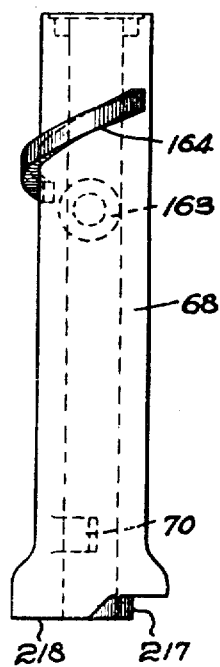
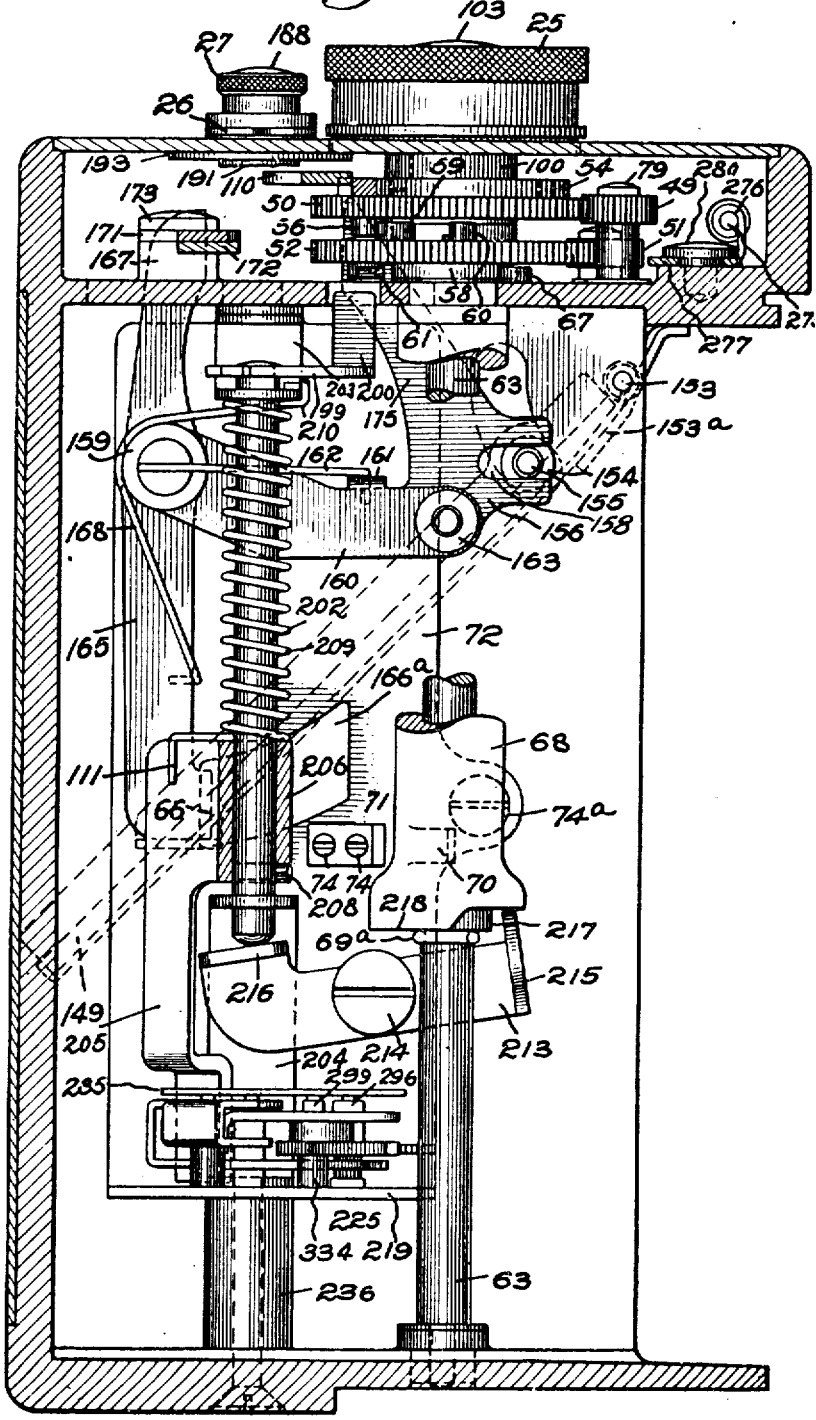
Inventor:
Edson S. Hineline
by Emery, Booth, Townsend, Smith & Shurtleff
Atty.

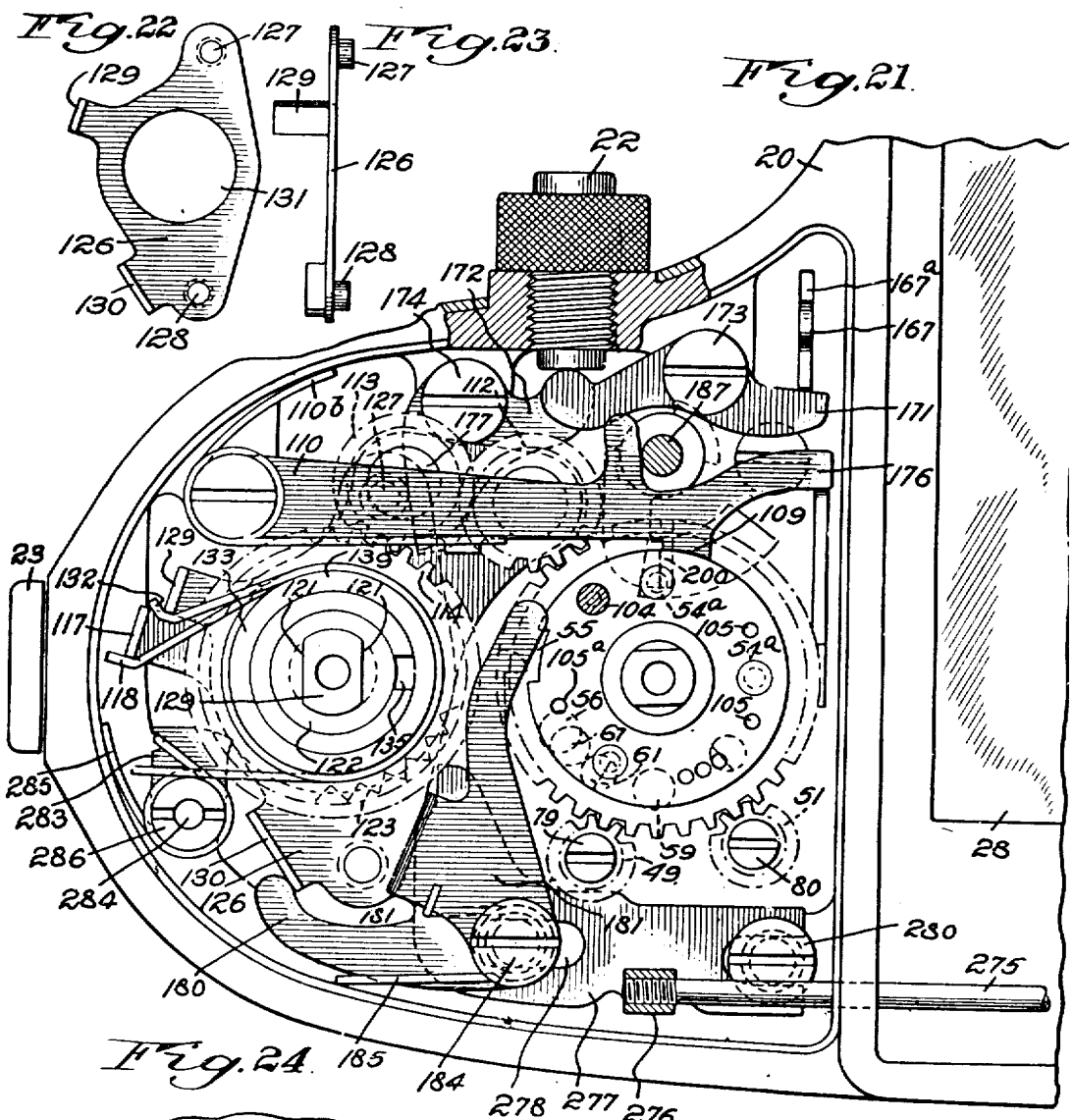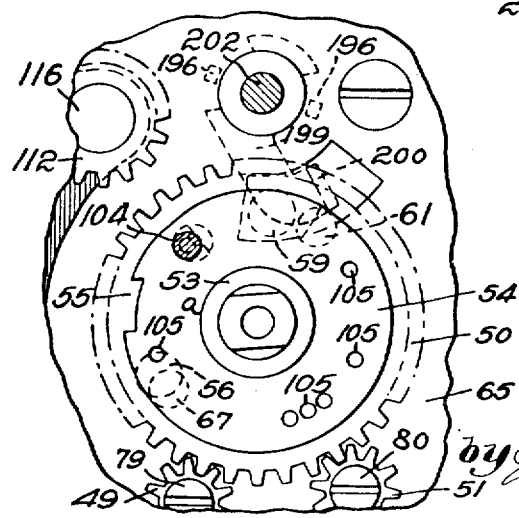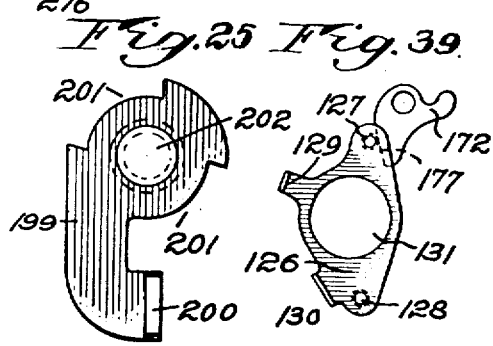

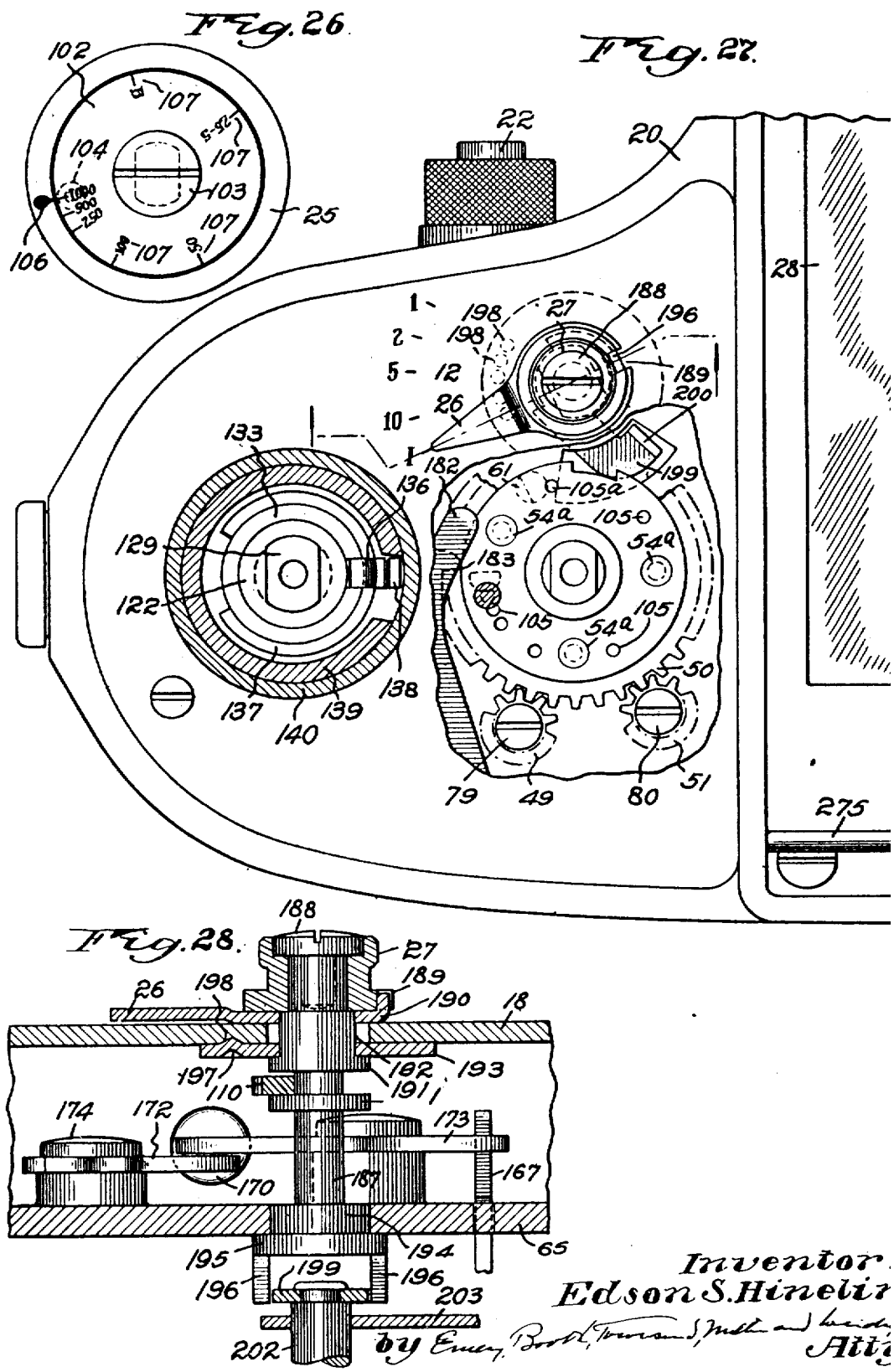

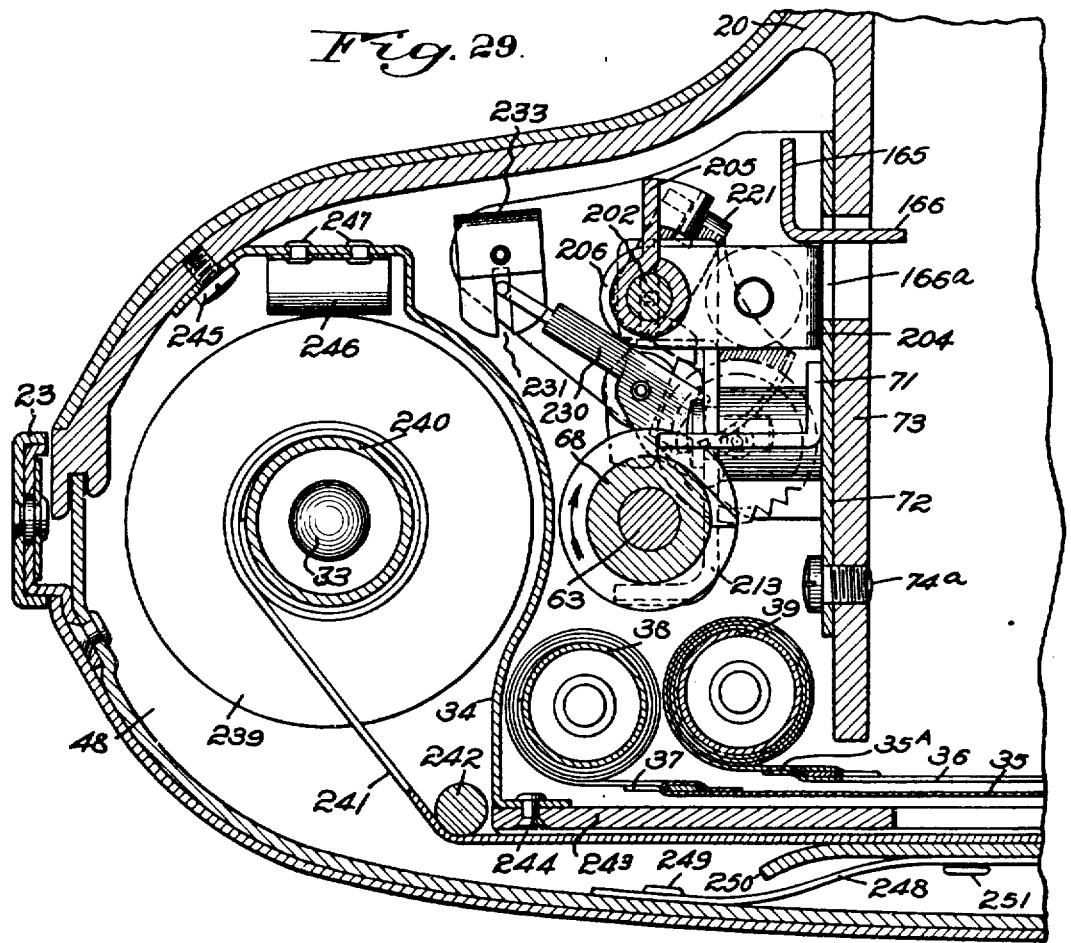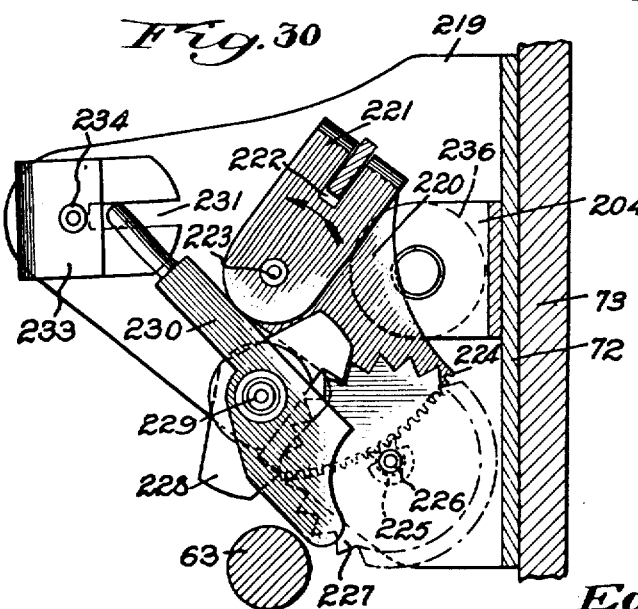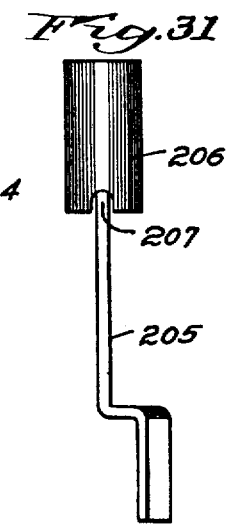

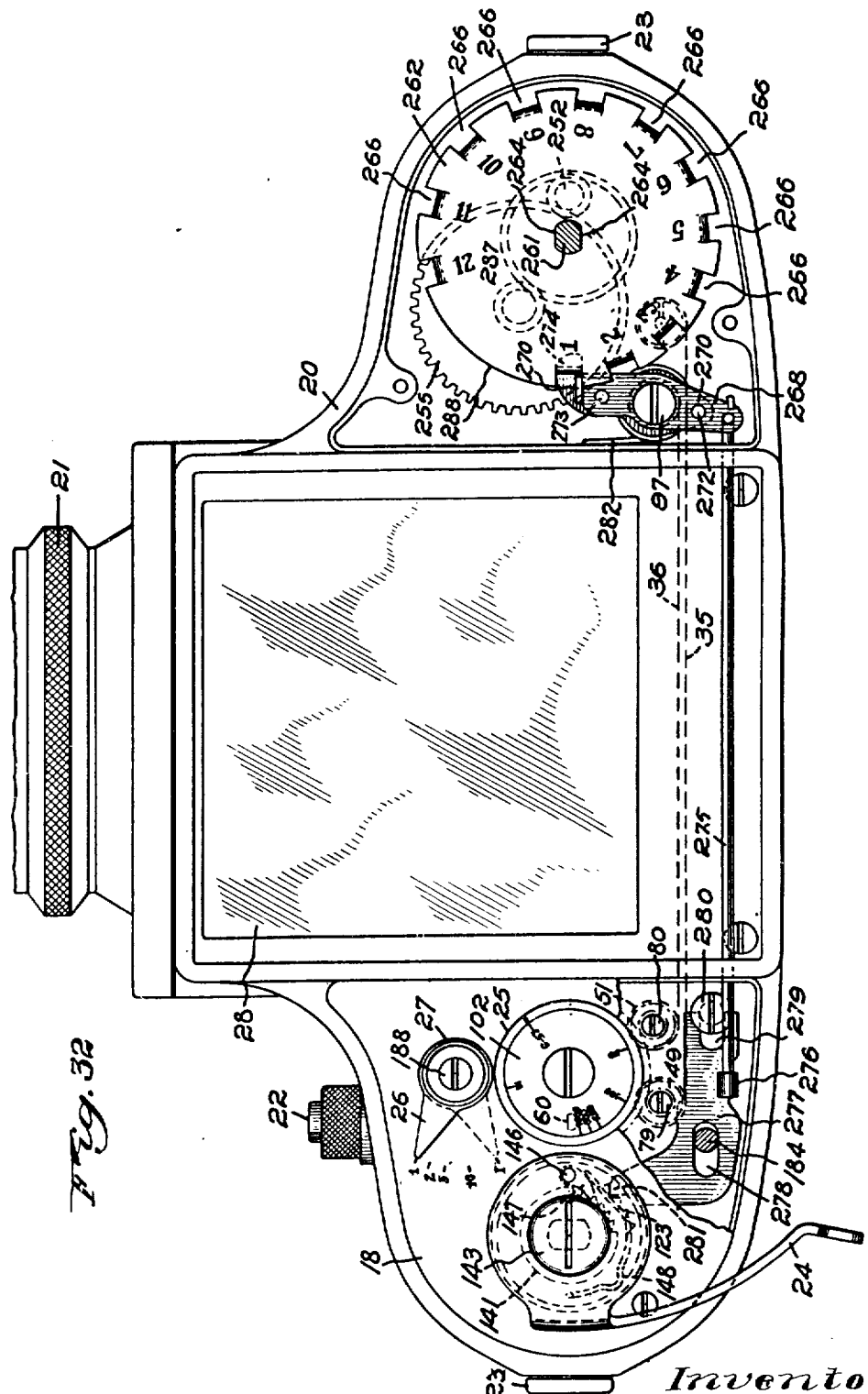

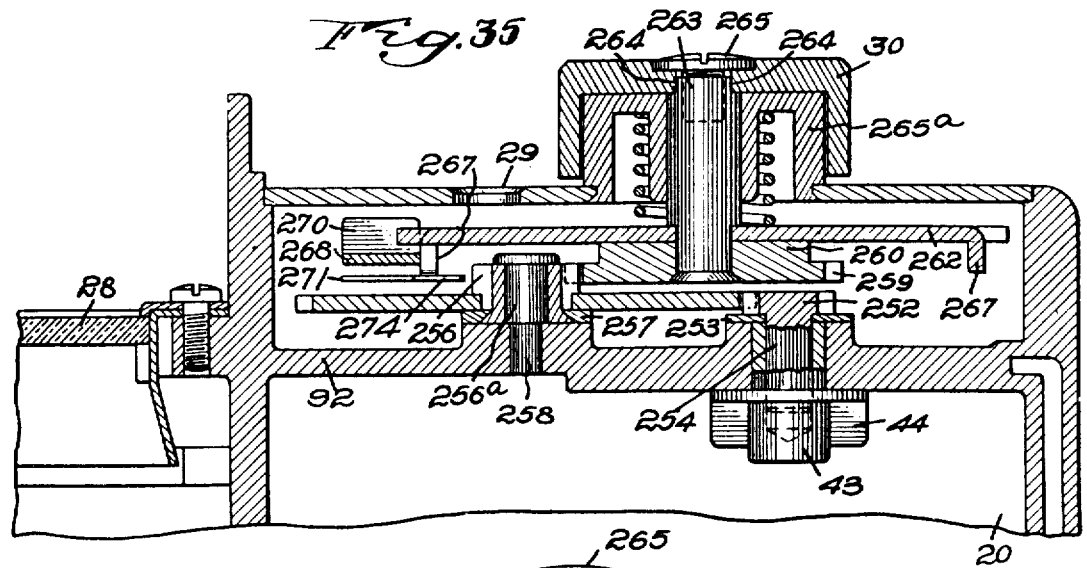
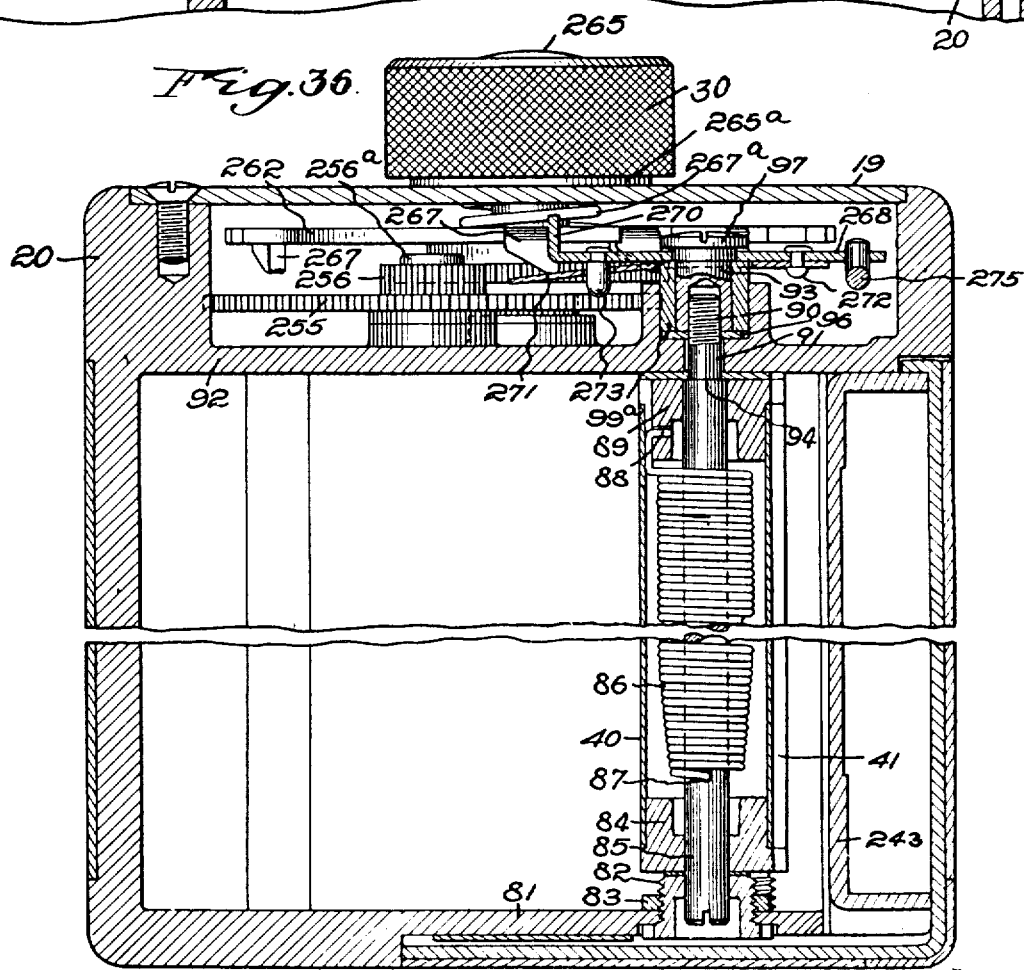

Patented May 5, 1942

2,282,284

UNITED STATES PATENT OFFICE 2,282,284

REFLEX CAMERA

Edson S. Hineline, Rochester, N. Y., assignor to The Folmer Graflex Corporation, Rochester, N. Y., a corporation of Delaware Original application August 5, 1939, Serial No. 288,505, now Patent No. 2,233,345, dated February 25, 1941. Divided and this application January 12, 1940, Serial No. 313,542

26 Claims. (Cl. 95—42)

is application is an exact division of my ending application on Ser. No. 288,505, filed ist 5, 1939, now Patent No. 2,233,345, dated uary 25, 1941, and is filed in compliance with fficial requirement for division. However, g to the intimate relation of the subject er of this divided-out invention to that of original application, it is necessary to repro- in their entirety the original specification drawings.

is invention relates to photographic cam- of novel construction lending itself to mod- nanufacturing practices.

order that the principle of the invention be readily understood, I have disclosed a embodiment or example thereof in the npanying drawings, wherein—

. 1 is a top plan view of the camera showing ocation of the various controls;

. 2 is a rear view of Fig. 1 with the film- ng door removed;

. 3 is a top plan view of the curtain gear ibly and release cam plate when the first in is fully wound to re-set position;

. 4 is a top plan view of the curtain winding and release cam plate in the position occu- when the first curtain has fully run down;

. 5 is a detail of the curtain rewind gear ibly when the curtains are fully wound, a side elevation of Fig. 3;

. 6 is a view similar to Fig. 5 when the cur- are fully run down, being in substance a levation of Fig. 4;

. 7 is a section of Fig. 6 on the line 7—7 of;

. 8 is an enlarged detail in plan of the shut- eed setting dial and knob;

. 9 is a partial top plan view of the camera the shutter mechanism plate removed to the shutter mechanism in set condition;

. 10 is a detail of the second curtain release

. 11 is an edge view of Fig. 10;

. 12 is an enlarged detail of the idler gear plate;

. 13 is a detail in section showing the mirror mechanism;

. 14 is a vertical transverse section through utter and film transport mechanism, show- s relationship to the mirror re-set mecha- 15 is an enlarged sectional detail of the r release lever and the mirror re-set mecha- 16 is a top plan view similar to Fig. 9, wherein the shutter has been released and the first curtain has run all the way down;

Fig. 17 is a vertical transverse section through the camera showing the position of the mirror after it has been released and the relation of its associated parts;

Fig. 18 is a detail of the mirror re-set cam member, the first curtain having run all the way down;

Fig. 19 is a vertical transverse section through the camera showing the position of the mechanism when the shutter has been rewound and is ready for a second exposure;

Fig. 20 is an enlarged detail of the mirror re-set cam member in the position it occupies when the mechanism is positioned as in Fig. 19;

Fig. 21 is a top plan view similar to Fig. 3, both curtains, however, having been released and run all the way down;

Fig. 22 is an enlarged detail of the bulb exposure rocker arm;

Fig. 23 is an edge view of Fig. 22;

Fig. 24 is a plan view of part of the shutter mechanism showing the position of the slow shutter speed retarding lever when the retarding lever is about to release the second curtain;

Fig. 25 is an enlarged detail of the slow shutter speed retarding lever;

Fig. 26 is a plan view similar to Fig. 8, excepting that the dial has been moved to indicate a speed of .001 second;

Fig. 27 is an enlarged plan view with a part of the shutter winding mechanism cut away to show more clearly the construction of the rewind friction drive, a section of the shutter plate having been cut away to show more clearly the operation of some of the parts;

Fig. 28 is an enlarged detail assembly in transverse section showing the relation of the slow shutter speed dial and its associated mechanism;

Fig. 29 is a vertical section through the camera showing the curtain rollers, the film rewind spool in section and the slow shutter speed retarding mechanism;

Fig. 30 is an enlarged plan view of the shutter slow speed retarding mechanism;

Fig. 31 is an enlarged detail of a part of the slow shutter speed control member;

Fig. 32 is a top plan view of the camera with the film feed mechanism cover removed to show the film feed mechanism, a part of the shutter mechanism cover having been broken away to show the interlock between film winding mechanism and film feed mechanism;

33 is a sectional detail of Fig. 37 on the line 33—33 thereof;
34 is a section through Fig. 38 on the bro- 34—34 thereof;
35 is a vertical transverse section through a measuring mechanism;
36 is a vertical transverse section through the curtain rollers showing the film meas- nechanism;
37 is an enlarged detail of the film meas- nechanism when in condition to allow the ing of film to the position of first expo- 38 is an enlarged detail showing the condi- the film measuring or spacing mechanism rewinding of film, but before the inter- r mechanism has commenced to function;

39 is a detail of a bulb operating rocker id a cooperating bell crank.

mportant object of my invention is to pro- camera of the type wherein the mirror is atically reset as the shutter is rewound, hich camera has a shape that is conven- o hold in the hands with the greatest it of comfort combined with easy opera- A further object is to provide a camera of irror or reflex type, wherein the parts per- g to the mirror operation coordinate with winding of the shutter and with the ma- tion of the film.

iall refer first to the general construction erating parts shown in Figs. 1 and 2. In the shutter cover plate is indicated at e index mechanism cover plate at 19, the a body at 20, the objective lens at 21, the e button at 22, the camera back latches at , the film winding lever at 24, 24, the shut- tting or shutter winding knob at 25, the hutter speed pointer at 26, the slow shutter knob at 27, the ground glass screen at 28, rposure frame window at 29 and the counter nob at 30.

: take-up spool shaft is indicated at 31 in : and elsewhere, the take-up spool driving at 32, the take-up spool shaft at 33, and the up spool housing at 34. The camera is ied with two curtains of which the No. 1 in is indicated at 35 and the No. 2 curtain A. The No. 2 curtain ribbons are indicated , 36, and the No. 1 curtain ribbons at 37, 37. irst or No. 1 curtain take-up roller is indi- at 38 and the second or No. 2 curtain take- iller at 39. The tension roller for the sec- curtain is indicated at 40, and the tension · for the first curtain is indicated at 41. take-up spool housing is indicated at 42, the off spool shaft at 43, the take-off spool driv- log at 44, the take-off spool stud shaft at 45 he tripod socket at 46.

the use of the camera, a spool of sensitized rial customarily referred to as the film is ed in a film chamber 47, indicated at the : in Fig. 2. The film is led across back of camera onto a take-up spool in the spool aber 48, and is caused to be wound up by action of the winding lever 24, as will be ; fully described hereinafter.

y invention more particularly pertains to the or movement subsequently to be described the coordination thereof with the other fea- s of the entire mechanism.

*utter and shutter winding.*—The shutter in the camera herein disclosed is similar he shutter disclosed in my earlier co-pending application Ser. No. 271,335, but it differs therefrom principally in the control means therefor. The shutter does, however, employ the two curtains 35, 35A, respectively shown most clearly in Figs. 2 and 29. The position of the said two curtains, when the camera mechanism is in condition for making an exposure, is clearly shown in Fig. 2, wherein the curtain ribbons 37, 37 of the first curtain 35 are entirely wound up on the spool or roller 38, the second curtain 35A being wound up on spool or roller 39. Said curtain 35 is also attached to curtain roller 41 and second curtain ribbons 36, 36 are attached to curtain tension roller 40. The curtain roller or spool 38 is provided with a pinion 49 shown in dotted lines in Fig. 2 as meshing with the curtain winding gear 50, shown in dotted lines in Fig. 2 and upon a larger scale in Figs. 3, 4, 5 and elsewhere. The curtain spool or roller 39 is provided with a pinion 51 shown in dotted lines in Fig. 2 as meshing with curtain winding gear 52, also shown in dotted lines in Fig. 2, and shown upon a larger scale in Figs. 6 and 7 and elsewhere. The said pinions 49 and 51 and the curtain winding gears 50 and 52 are most clearly shown in Fig. 17, enlarged details being, however, shown in Figs. 3 to 7.

As shown in Fig. 5, the curtain winding gear 50 has attached a hub 53, and cam plate 54 is also attached by rivets 54a (Fig. 9). Cam plate 54 has a notch 55 clearly shown in Figs. 3 and 4. Gear 50 also has a stud or pin 56 hereinafter referred to. Gear 52 has an upper hub 57, a lower hub 58, a rewind pin 59, release pin 60 and slow shutter control pin 61. Gear 50 is carried on shaft 63 and keyed thereto by means of a spline clearly shown in Fig. 14. Gear 52 is free to rotate on shaft 63 through a part of a revolution, and is separated from gear 50 by a suitable thrust washer and from mechanism-housing lower plate 65 by thrust washer 66. A stop pin 67 is attached to mechanism-housing plate 65, as clearly shown in Figs. 5 and 6. The purpose of stop pin 67 is to engage pin 61 in gear 52 when the second curtain has traveled its full distance.

The purpose of pin 56 on curtain-winding gear 50 and rewind pin 59 on curtain winding gear 52 is to cause said gear 52 to be carried with gear 50 when gear 50 is turned in a contraclockwise direction to rewind the shutter curtain. Pins 56 and 59 serve also to hold the second curtain when the shutter is in an entirely rewound condition. Attached to the lower part of shaft 63, as shown in Figs. 14, 17 and 19, is a cam member 68 keyed to shaft 63 by pin 69 and held in place with lock ring 69a (Figs. 17 and 19). The said cam member 68 carries a dog 70 which engages with stop member 71 attached to mechanism bracket 72 and camera wall 73 (Figs. 14, 17, 29, 30, etc.) with screws 74, 74, most clearly shown in Fig. 17. The purpose of this stop is to limit the motion of the first curtain winding gear 50 at the completion of its travel.

Again referring to Fig. 1, the curtain take-up roller 38 is provided on its lower end with a formation (not shown) engaging a bearing 75. The second curtain take-up roller 39 is also provided with a formation engaging a bearing 76 at its lower end. The first curtain roller 38 is provided with an extending shaft 77 and the second curtain roller 39 is provided with an upwardly extending shaft 78, both shown in dotted lines in Fig. 2. The pinion 49 is attached to said shaft 77 by means of a spline (not shown) and held thereon by screw 79, most clearly shown in Fig. 9, haft 18 is provided with a pinion 51, best in Fig. 9 as attached in a like manner and y a screw 80. The construction of the curension rollers 40, 41 is most clearly shown . 36, wherein the camera bottom plate is ted at 81, the tension roller bearing at 82, nsion roller bearing lock nut at 83, the curoller bushing at 84, the curtain roller tenhaft at 85 and the curtain roller tension at 86, the latter having one end engaging 87 in the shaft 85. The other end ena hole 88 in curtain roller bushing 89. Said a roller bushings 84 and 89 are attached to a roller 40 and are held integral therewith. n tension shaft 85 has an upwardly exg end provided with threads 90 passing h a hole 91 in the upper camera wall 92 engaged by shoulder screw or nut 93. 85 is also provided with a shoulder 94 engages washer 95. A second washer 96 d over the upper end 90 of shaft 85. This tre provides a ready means of adjusting 1-roller tension, which is accomplished by ng a screw driver in slot 96a of shaft 85 aving first loosened nut 93, which also has ed head 97. The shaft 85 then can be in a clockwise direction to increase the i of the spring 86. When sufficient tenobtained, the nut or shoulder screw 93 is in a clockwise direction, thus holding 15 in a fixed position through the friction hers 95 and 96 engaging camera wall 92. irtain tension roller 41 is of similar conon, and therefore need not be described il.

n referring to Fig. 2 (and Figs. 3 to 6), it adily be understood that if gears 50 and e caused to turn in a contraclockwise di, pinion 49 meshing with gear 50 and pinmeshing with gear 52 would be caused to a clockwise direction as viewed from the the camera, thus winding up on curtain 38 and 39 respectively, curtain tapes or 37 of the first curtain 35 and the second 35A. The curtains will now appear as in in the fully wound condition or in that on just prior to making an exposure. gear 50 is released in a manner hereinxplained, pinion 49 meshing with gear 50 free to turn, and also the curtain roller :h is attached to gear 50 is free to turn : first curtain 35 will then be wound up on roller 41 under the influence of curtain ipring 86. The construction of curtain I and spring 86 is most clearly shown in , already referred to. When gear 52 is 1, the pinion 51, which meshes therewith, o turn. The curtain roller 39 is also free , thus allowing the second curtain 35A round up on curtain roller 40 under the e of spring 86.

ver, means are provided to control the of the release of gear 52 with respect to ase of gear 50 so as to provide means for ing the slot width between the first curand second curtain 35A, and thus obposures of different time (that is to say, n a different slot width).

eviously stated, gear 50 is provided with a nd gear 52 is provided with pins 59, 60 and nost clearly shown in Figs. 3, 4, 5, 6 and 7. e hub 53 of gear 50 is fitted the shutter nob 25, also shown in Figs. 1 and 2, and a hub 100 most clearly shown in Fig. 14. ob 25 is caused to be thrust downwardly to the position shown in Fig. 14, under the influence of spring 101 (Fig. 14) until the end of hub 100 rests on cam plate 54 that is attached to gear 50. Spring 101 is held down by shutter setting dial 102 (Fig. 8) that is held to shaft 63 by shoulder screw 103. Said knob 25 is provided with a pin 104 which engages holes 105 and 105a of shutter plate 54, most clearly shown in Figs. 9, 21 and 24. The knob 25 can be raised to the position shown in dotted lines Fig. 14, and then revolved around the hub 53 until pin 104 engages any one of the holes 105 and 105a in cam plate 54. This constitutes means for changing the position of pin 104 with respect to gear 50 and cam plate 54. Said pin 104 also serves to key the knob 25 to the cam plate 54. Thus the knob 25 is caused to turn with cam plate 54. Said knob 25 is provided with an index mark 106. The index plate 102 is provided with a series of shutter speed designations 107, 107. This provides means for selecting the position of pin 104 with respect to cam plate 54. As shown in Figs. 9 and 14, the upper end of shaft 63 is provided with flats. The index plate 102 is provided with an opening 108 (Fig. 8) to fit over the upper end of shaft 63, and it is held in place by screws 103. Since curtain winding gear 50 is keyed to shaft 63 and cam plate 54 is riveted to gear 50 and index plate 102 is keyed to shaft 63, the relationship between cam plate 54 and index plate 102 will remain constant, but the knob 25 can be changed with respect to cam plate 54 and index mark 106 and shutter speed markings 107 clearly show what this relationship is at any time.

Fig. 6 shows the gear assembly in the condition in which the elements thereof will be when the shutter curtain 35, 35A are run all the way down. In such situation the pin 61 on the gear 52 will be held against pin 67 on mechanism housing plate 65 under the tension of shutter curtain 35A. As previously stated, said gear 50 is attached to shaft 63, and shaft 63 carries cam member 68 having a stop dog 70 held against stop 71 under the tension of curtain 35 and curtain ribbons 37. This construction is best shown in Fig. 4 in dotted lines, and also in Figs. 14 and 17. When shutter setting dial 25 is turned contraclockwise, it carries with it curtain winding gear 50 and cam plate 54 by means of pin 104 on knob 25 until the cam plate notch 55 reaches the position shown in Figs. 3 and 9. As the gear 50 is turned in a contraclockwise direction, the pin 56 is carried with gear 50 until it contacts with pin 59 on the gear 52, thus carrying said gear 52 with it until it is in the position shown in Fig. 5. When the notch 55 reaches the position shown in Fig. 9, an extended portion 109 of first curtain release lever 110 pivoted on shoulder screw 110a, will engage said notch 55 under the influence of a spring 110b, thus holding the cam plate 54, gear 50 and gear 52 in this position, which is the curtain reset or "ready" position. The shutter setting or winding knob 25 has been referred to as the means for restoring the first curtain 35 and second curtain 35A to the reset position, but in reality said knob 25 does not strictly serve this purpose, since the curtains 35 and 35A are reset through the medium of idler pinions 112 and 113 and shutter drive gear 114, shown in Figs. 9, 12, 14 and 21. The said idler pinions 112 and 113 are attached to a pivot plate 115 by means of shoulder rivets 116, 116, as shown in Fig. 12. The said pinion pivot plate 115 is provided with an extending arm 116a having an upturned end 117, and said plate 115 ed to move in a clockwise direction under
luence of spring 118 (Fig. 9).

*winding.*—The construction of the film
g mechanism is shown in section in Fig.
erein a shaft 119 passes through mecha-
ottom-plate 65 which has an upstanding
120 forming a bearing therefor. Said
119 is provided with flats 121, 121 over
a ratchet sleeve 122 is placed, which has
i on its lower end a ratchet wheel 123.
vot plate 115 of Fig. 12 is provided with a
24 for the purpose of fitting over the
t sleeve 122, and it is free to pivot thereon
the influence of spring 118. Beneath
115 is a spacing washer 125, and between
r 125 and the ratchet wheel 123 is fitted
operating plate or rocker arm 126, a de-
hereof is clearly shown in Figs. 22 and 23.
late 126 is provided with studs 127 and 128,
ied ends 129 and 130 and a hole 131. The
t sleeve 122 passes through hole 131, as
shown in Fig. 14. The operating plate
caused to rotate in a clockwise direction
the influence of spring 132 co-acting with
turned end 129.
extending sleeve 122 of the ratchet wheel
as fitted thereover the gear sleeve 133 of
ar 114. The said sleeve 133 is free to turn
eve 122. However, sleeve 133 is provided
a key-way 135, shown most clearly in Figs.
d 21, into which a key 136 of the clutch
member 137 is fitted, which is also provided
a second keying means 138 engaging clutch
139, the latter being a cylindrical spring
ng to open out against the inner wall of
ng knob 140, most clearly shown in Figs.
d 27.
can be clearly seen from Fig. 27, if the film
ing knob 140 is turned in a clockwise direc-
the clutch spring 139 tends to travel with
inding knob 140 due to the pressure exerted
ie said clutch spring, which carries with it
ipturned portion 138 of keying member 137
he inward turned portion of keying member
Since the key 136 engages slot 135 of the
e 133, the latter will also be caused to turn
s an undue load is placed on sleeve 133
gear 114. Thus gear 114 can be stopped but
ilm winding knob 140 can continue to turn
use of the friction engagement between it
the driving spring 139. The purpose of this
ision will be more fully disclosed presently.
ain referring to Fig. 14, the said film wind-
knob 140 is keyed to shaft 119 by means of
said flats 121, 121 on shaft 119 and the hole
iob 140 to engage therewith. Also engaging
flats 121, 121 is a ratchet plate 141 and a
ing washer 142. Said sleeve 122, knob 140,
het 141 and spacer 142 are clamped to the
t 119 by means of shoulder screw 143. The
ilder portion 144 of shoulder screw 143 has
cient length to allow winding lever 24 (Fig. 1)
otate freely thereon. A ratchet pawl plate
is free to rotate about the spacing washer
but it has riveted thereto a pin 146 which,
est shown in Fig. 32, carries ratchet pawl
engaging film winding lever 24. A spring
holds ratchet pawl 147 in engagement with
het 141. It will be seen that any move-
it of the film winding lever 24 in a clockwise
ction will cause the winding knob 140 to
ilso turned in a clockwise direction, but when
l film winding lever 24 is moved in a contra-
kwise direction, no motion of knob 140 will
e place.

The purpose of the structure just described is
to enable the operator to rewind the shutter at
the same time that a film spool is turned for
winding or feeding the film. Since it will al-
ways be necessary to turn the film spool a greater
distance than the shutter rewinding mechanism,
it is necessary to provide a clutch means, one
construction of which I have set forth.

*Combined film winding and shutter winding.*—
As previously stated mainly with reference to Fig.
9, the pivot plate 115 carrying gears 112 and 113
(Fig. 12) is mounted on the ratchet sleeve 122.
The pinion 113 meshes with the shutter drive
gear 114 and pinion 112 which in turn meshes
with shutter winding gear 50. Spring 118 causes
said pivot plate 115 to rotate in a clockwise
direction, thus holding pinion 112 in mesh with
gear 50. As the film winding lever 24 is rotated
in a clockwise direction, the shutter drive gear
114 is also caused to rotate in a clockwise direc-
tion and through pinions 112 and 113 the cur-
tain gear 50 is caused to turn in a contraclock-
wise direction until said gear 50 is in position
shown in Fig. 9. This will complete the shutter
winding and any further motion of the film
winding lever 24 can only take place through the
slippage of clutch member 139, because said cur-
tain gear 50 is prevented from turning by reason
of the dog 109 of lever 110 engaging slot 55 of
the cam plate 54. However, it is necessary
further to wind the film spool, which is engaged
by shaft end 31 on shaft 119 having the key 32
for engaging the slots in the take-up spool. The
motion of film winding lever 24 is continued until
sufficient film has been wound on the film take-
up spool to provide an area for the next exposure,
after which all motion of the film winding knob
140 is arrested through ratchet plate 123 by
means to be more fully described presently.

I will next describe the mirror movement
which is what the present application is more
particularly directed to; the mirror movement
is, however, intimately interrelated to numerous
other parts of the mechanism described herein.

*Mirror movement.*—The camera is also pro-
vided with a mirror frame 149, shown in the set
position in Fig. 14 and in the released position
in dotted lines Fig. 17, and again in the set
position in dotted lines Fig. 19. As shown in Fig.
14, the mirror frame 149 is provided with an
angle plate 150 for holding the mirror in set
position. Said mirror frame is provided with a
hinge portion 151 and a spacer 152 having a pin
153 passing therethrough and through camera
walls 73, 73 to provide a pivot for said mirror
frame, which is spring-loaded by spring 153a'
(Figs. 17 and 19) to cause it normally to turn in
an upward direction so that when the mirror is
released, it will move upward into position shown
in Fig. 17.

The mirror frame is also provided with a stud
154 which passes through the camera wall 73.
The said stud is provided with a reduced end
portion 155 which engages mirror reset arm 156,
most clearly shown in Figs. 15, 17 and 19. An
opening 157 in the camera wall 73 allows mirror
stud 154 to travel through an arc of approxi-
mately ninety degrees. Said arm 156 is pro-
vided with an elongated slot 158 (Fig. 19) for
engaging pin 155 of stud 154. Thus any motion
of the arm 156 will be transmitted to the mirror
frame 149. Said arm 156 is located on a shoulder
stud 159, shown in Figs. 15, 17 and 19. Also
pivoted on shoulder stud 159 is a second arm 160
having a bent-over portion 161 which is engaged by spring 162 tending to cause arm 160 to rotate in a clockwise direction until the bent-over portion 161 engages arm 156, thus causing any motion in a clockwise direction of arm 160 to be transmitted to arm 156. Said arm 160 is also provided with a stud 163 which is engaged by mirror reset cam 164, most clearly shown in Figs. 13, 14 and 15, the purpose of which is to cause the mirror frame 149 to be reset when the shutter curtain is rewound. This will be more fully described after I have described the manner of making an exposure. A third lever 165 is also pivoted on stud 159 having an inwardly turned portion 166 passing through opening 166a (Fig. 19) in the camera wall and an upwardly extending arm 167 passing through an opening 167a (Fig. 9) in the mechanism-bottom-plate. The purpose of the inwardly extending portion 166 is to hold the mirror in set position as in Fig. 19. Said lever 165 is caused to rotate in a clockwise direction about pivot 159 under the influence of spring 168.

*Instantaneous exposure.*—I will now describe the manner of making an instantaneous exposure for which the shutter setting knob 25 and dial 102 will be in the position shown in Fig. 8. The shutter control mechanism will be in the set condition shown in Fig. 9. Pressure on shutter release knob 22, having a shaft 169 and a washer 170, will engage bell cranks 171 and 172. Bell crank 171 is mounted on a shoulder screw 173 and bell crank 172 is mounted on a shoulder screw 174. Bell crank 171 will be caused to rotate in a contraclockwise direction and bell crank 172 in a clockwise direction. When bell crank 171 is caused to rotate in a contraclockwise direction, arm 167 is caused to be moved forward, thus swinging on pivot 159 to the position shown in Fig. 17, thus disengaging inwardly turned end 166 (Fig. 14) from angle plate 150 of mirror frame 149, allowing said mirror frame to swing up to the position shown in Fig. 17. As the mirror frame 149 swings up, the stud 154 is carried therewith, causing the arm 156 to be carried with said stud through the engagement of pin 155 until it reaches the position shown in Figs. 15 and 17. The arm 156 is provided with a part 175 (Figs. 16 and 19) which engages an arm 176 of the shutter release lever 110. Thus the dog or projection 109 of said lever 110 is withdrawn from slot 55 of the cam plate 54. Prior to this action of the mirror frame 149, the bell crank 172 is also rotated about its axis at shoulder screw 174. Said bell crank 172 is provided with a cam shaped end 177, most clearly shown in detail in Fig. 39, the purpose of which is to engage the stud 127 of rocker plate 126, shown best in Figs. 22, 23 and 39.

The rocker plate 126, whose mounting has previously been described, is caused to rotate in a contraclockwise direction carrying with it the upturned end 129 which engages upturned end 117 (Fig. 12), causing gear pivot plate 115 also to be rotated in a contraclockwise direction, thus disengaging pinion 112 from curtain-winding gear 50. This action takes place prior to the releasing of said mirror frame 149. This is necessary in order that gear 50 will be free to rotate when dog 109 of lever 110 is disengaged by extending arm 175, which is actuated by the mirror frame 149, as previously described.

When the arm 175, which passes through the slot 119 of the mechanism bed plate 65, contacts with the arm 176, thrusting lever 110 in a forward direction, it disengages dog 109 from slot 55 in the cam plate 54, thus allowing curtain winding gear 50 to rotate. At the time the winding gear 50 became disengaged from curtain pinion 112 became disengaged from curtain winding gear 50, the upturned end 130 of the rocker plate 126 was also carried in a contraclockwise direction away from the horn-like end 180 of a lever 181, most clearly shown in detail in Figs. 10 and 11, and constituting the second curtain release lever. Said lever 181 is of a folded sheet metal structure really forming three arms, namely, arm 180 previously referred to, disengaging arm 182 and dog 183, the whole being pivoted on screw 184 and being under the influence of spring 185, shown in Fig. 23. When the button 22 was pressed as previously described and rocker plate 126 was caused to move in a contraclockwise direction allowing horn-shaped arm 180 to move in a contraclockwise direction, the dog 183 was permitted also to move in a clockwise direction and to engage pin 60 of curtain winding gear 52, as most clearly shown in Fig. 16. The mechanism will now be in the position shown in Fig. 16 wherein the curtain winding gear 50 carrying cam plate 54 has turned through a partial revolution and carried with it pin 104, which on further turning will engage said lever end 182, causing dog 183 to be removed from the face of pin 60 of curtain winding gear 52, thus allowing the second curtain 35A to close. The setting just described is for a wide opening (that is, the greatest possible slot width), and it is with this slot width that the ½₅ second exposure takes place.

It will clearly be seen that if pin 104 is set to engage any one of the other index holes 105, 105 of the cam plate 54, the arm 182 of lever 181 will be caused to be thrust outwardly at an earlier time, thus releasing the second curtain 35A at a shorter interval after the release of the first curtain 35, and thereby providing a narrower aperture in the curtain structure.

If, for example, the pin 104 were in the position shown in Figs. 26 and 27, the shortest aperture would be provided. That is, the second curtain 35A would be released almost as soon as the first curtain 35 gets in motion, thus providing a very narrow aperture and a very high shutter speed. If, however, pin 104 were set in the location of index holes 105, the curtain release pin 104 would never contact with the arm 182 of lever 181, because curtain winding gear 50 and cam plate 54 would be stopped before pin 104 reached contact arm 182, by reason of the dog 70 of the cam member 68 striking stop 71, as shown in Fig. 17. Therefore, the pin 104 under such conditions would not release the second curtain 35A. The first curtain 35 would run all the way down and leave the aperture fully open and the second curtain 35A would be held wound up on the curtain roller 39, thus providing a full aperture. An exposure would take place and continue until exposure button 22 is released. Rocker plate or arm 126 would thereupon be caused to move in a clockwise direction under the influence of spring 132 against upturned end 129 of the bulb exposure rocker arm or operating plate 126, which would case the cam face 130 thereof to thrust lever arm 180 outwardly, thus disengaging dog 183 from pin 60 of the curtain winding gear 52, and allowing the second curtain 35A to close. This type of exposure is commonly called a "bulb" exposure. The structure of bulb exposure rocker arm 126 (Fig. 22) and gear pivot plate 115 (Fig. 12) with upturned end 117, engaged by upturned end 130 when rocker arm 126 is moved in a contraclockwise direction, is provided to allow rocker arm 126 to return to starting position, whereupon gear pivot plate 115 will be returned to its starting position under the influence of spring 118, causing gear 112 to mesh with curtain winding gear 50. The dog 183 will nevertheless engage pin 60 even though pinion 112 does not fall into mesh with curtain winding gear 50.

As curtain winding gear 50 is released and allowed to turn in a clockwise direction, it allows the first curtain 35 to run down, the shaft 63 turning with gear 50, and cam member 68, in turning, carries with it the cam 164. Since mirror frame 149 was in its upper position before curtain gear 50 started to rotate, roller 163 will be in position shown in Fig. 15, and as said cam member 68 revolves in a clockwise direction, its cam 164 will raise roller 163, thus causing it to pass over the top surface of cam 164. Said roller 163 on lever 160 can move upward away from lever 156 under the influence of spring 162, thus allowing cam 164 to pass under roller 163 while the mirror is in the raised position. This action is most clearly shown in Fig. 15.

*Snubber or cushioning action.*—The action of cam 164 in raising roller 163 also serves as a snubber on the first curtain 35. A gradually increasing pressure is introduced by the tensioning of spring 162 as the cam 164 passes under the roller 163. After said cam 164 has completely passed roller 163, said lever 160 returns to its position shown in Figs. 17 and 18.

The mechanism is now in the position shown in Figs. 17, 18 and 21, wherein the mirror frame 149 is in the "up" position; curtain winding gears 50 and 52 have allowed the curtains 35 and 35A to run all the way across and pinion 112 is again engaged with curtain winding gear 52 under the influence of spring 118 and the upturned end 117 of pivot member 115 which, as stated, carries pinions 112 and 113.

*Second exposure.*—Before a second exposure can be made, it is necessary to restore the shutter mechanism to the condition shown in Fig. 9 and at the same time to rewind or feed a new supply of film. This is done in the following manner.

Rewind lever 24 (Figs. 1 and 32) is moved in a clockwise direction and then returned, and this motion is repeated until said lever can be moved no further in a clockwise direction. When said lever 24 is moved in a clockwise direction, gear 114 (see Fig. 21) is thereby caused to rotate in a clockwise direction, driving pinion 113 in a contraclockwise direction, pinion 112 in a clockwise direction, and curtain winding gear 50 in a contraclockwise direction. This motion will continue until curtain winding gear 50 and cam plate 54 are returned to the position shown in Fig. 9, wherein dog 109 of lever 110 will drop into notch 55 of cam plate 54, thus stopping curtain winding gear 50 from turning further. Said gear 50 carries a stud or pin 56, shown in section in Fig. 7, and the curtain winding gear 52 carries a stud or pin 59. As the curtain winding gear 50 advances in a contraclockwise direction carrying with it stud 56, said stud will contact with stud 59 or curtain winding gear 52, carrying said gear 52 along with said gear 50 until the condition results shown in Fig. 9. Thus both curtains 35 and 35A have been restored to the closed position. When the said curtains have run all the way down, there will be a space separating stud 56 from stud 59. This space is sufficient to allow said first curtain 35 to overlie said second curtain 35A so that, when said curtains 35 and 35A are returned to the fully wound position, they will overlie or "cap" as the curtain passes the exposure opening.

As the curtain winding gear 50 was first turned in a clockwise direction, the mirror frame 149 was in the position shown in Fig. 17. Levers 156 and 160 are also in the position shown in said figure, and cam member 68 and cam 164 were in the position shown in Fig. 17 and also in Fig. 18 wherein dog or lobe 70 on cam member 68 is in contact with bracket 71 on the camera wall 73.

As the curtain winding gear 50 continued to rotate, the shaft 63 was turned with gear 50 by means previously described, thus rotating cam member 68 having cam 164. The forward end of said cam 164 thus passed over the top of the roller 163, thus camming down levers 160 and 156 and the mirror frame 149 to the position shown in Figs. 14 and 19 through the agency of roller 163, lever 160, the turned-over portion 161, lever 156, and pin 154 on stud 155. The shutter mechanism and the mirror frame 149 will now be restored to proper condition for a second exposure. It is to be understood, however, that I have not yet described the manner in which forward motion of the lever 24 is stopped after the shutter has been rewound. This I will do after describing the slow shutter speeds.

*Slow shutter speed.*—I have previously referred to the slow shutter speed knob 27 and the slow shutter speed pointer 26, shown in Fig. 1. On shutter plate 18, Fig. 1, I have provided a series of numerals—1 designating one second, 2 designating ½ second, 5 designating ⅕ second, and 10 designating 1/10 second. I is a setting for all instantaneous speeds. For all speeds thus far described, the slow shutter speed pointer 26 was in the position of I, which is the position the parts occupy in Fig. 27. For the so-called slow shutter speeds or those speeds wherein a time delay is introduced between the instant the first curtain 35 is released and the second curtain 35A is released, the shutter setting dial 102 and shutter setting knob will be positioned as in Fig. 8, with the index pointer 102 opposite 25—S of the slow shutter speed dial 102.

Fig. 28 clearly shows the construction of the slow shutter speed knob 27, and the pointer 26 with its related parts. Said knob 27 is mounted on a shaft 187 by means of fillister head screw 188. Said knob 27 is provided with a notch 189 and the slow shutter speed pointer 26 is provided with an upturned key 190. The shaft 187 is provided with an enlarged upper end 191 with flats 192 which engage an index plate 193. The shaft 187 passes through shutter cover plate 18 (Fig. 1) and has attached to its lower end a boss 194 which has an enlarged flange 195 provided with extending prongs 196, 196. The boss 194 passes through a hole in the mechanism-housing lower plate 65. The index plate 193 is provided with a raised conical portion 197 to engage a series of indentations 198, 198 of the shutter cover plate 18. One indentation is provided for each position of the slow shutter speed pointer 26, as indicated in Fig. 27. The purpose of this construction is to provide a lock to hold the pointer 26 in any of the selected positions.

In Fig. 19 is shown that portion of the slow shutter speed operating mechanism that is below the lower shutter plate 65. Therein is shown at 199 a shutter retarding lever having an upturned end 200. A detail of said lever 199 is shown in 5. It is provided with two cut-outs forming
s 201, 201. The said lever is riveted to
202 as most clearly shown in Figs. 17, 19
8. The said shaft 202 is provided with an
bearing 203 and a lower bearing 204, which
rmed of angle plates riveted to the mecha-
plate 72. On the lower end of shaft 202 is
led a member 205, shown in detail in Fig.
provided with a hub 206 having a notch
erlying a pin 208 of shaft 202, thus keying
ember 205 to said shaft 202. Said pin 208
wn in position in Fig. 19 and in dotted lines
7. A spiral spring 209 having a hook end
hooked on the upper bearing 203, and it
turned-down end 111 which over-rides
er 205, as shown in Fig. 17.
spring 209 is both an expanding spring and
ional spring—that is, shaft 202 is thrust
/ard by said spring 209 and member 205,
also turned in a clockwise direction there-
'o the mechanism-plate 72 is attached a
12, as shown in Fig. 14, to which latter is
ed a rocker arm 213, best shown in Figs.
1 19, being attached to said boss 212 by a
er screw 214 and being free to rock thereon.
ter end of rocker arm 213 is provided with
-over portion having a rounded upper face
e shape of which is most clearly shown in
. The opposite end of the said rocker arm
provided with a bent-out end 216 which
ies the rounded end of shaft 202. On the
ce 215 rides the lower end of cam member
ch has a cut away portion 217 (shown in
4, 17, 19 and 20) forming a cam for oper-
he rocker arm 213. The position of said
t portion 217 of cam member 68 is such
hen the first curtain 35 has run all the
wn, the end 215 of said rocker arm 213
p on the surface 218 of cam member 68,
wn in Fig. 17, thus raising shaft 202 against
209 and retarding lever 199. The up-
end 200 is now in position in front of pin
learly shown in Fig. 17.
cycle is so timed that said upturned end
aised into the described position in rela-
pin 61 just before the dog 183 (Figs. 9 and
retracted from pin 60. It will readily be
at if pin 104 were located in any other of
ex holes 105 than in the one provided for
second or slow position, said dog 183 would
en thrust away from pin 60 before said
d end 200 was brought into position in
pin 61. The purpose of this construction
ard against the retarding action of the
curtain, so that only the second curtain
l be retarded when the curtains are set
widest slot.

*shutter speed retarding mechanism.*—
ism-plate 72 has its lower end bent out
angles forming a shelf 219, most clearly
n Figs. 19, 29 and 30. Mounted on the
9 is the retarding mechanism which con-
a sector member 220 and sector arm 221
a slot 222 into which the lower end of
205 engages. Said sector arm 220 is piv-
a shaft 223 and is free to rotate thereon;
ovided on its outer end with a series of
eth 224 which mesh with pinion 225
1 on shaft 226. Also mounted on shaft
star wheel 227, which is engaged by an
ent plate 228 mounted on a shaft 229.
ached to shaft 229 and caused to move
apement plate 228, is an oscillating mem-
having one end bent downward to engage
11 of inertia-member 233 mounted on a shaft 234. The said mechanism is also provided
with a top bearing plate 235, most clearly shown
in Figs. 17 and 19.

It will be evident that any motion of member
205 in a rotary direction around pivot 223 will
cause the sector member 220 to be oscillated on
shaft 223, and since said sector member 220 is
provided with gear teeth 224 meshing with pinion
225, star wheel 227 will be caused to rotate. The
escapement 228 is so constructed that as star
wheel 227 rotates, oscillating member 230 is
caused to move so as in turn to oscillate inertia-
member 233. This action puts a definite load
upon sector 220 causing retarding action to be
transmitted through member 205, shaft 202 and
retarding lever 199.

The platform member 219 is also supported
from the bottom of the camera by support mem-
ber 236. Since the retarding lever 199 (Fig. 25)
is provided with the two cut-out sectors 201, and
the shutter speed control mechanism is provided
with two fingers 196, 196, which are positioned
as clearly shown in Fig. 24 in dotted lines, the
distance the retarding lever 199 can travel in a
clockwise direction under the action of spring
209 is determined by the setting of slow shutter
speed pointer 26. Since fingers 196, 196 are con-
trolled by the slow shutter speed point 26, this
position with respect to sectors 201 is definitely
determined. Spring 209 tends to cause retard-
ing lever 199 to travel in a clockwise direction
until one end of sector 201 is stopped by a finger
196. Fingers 196 can be changed in position so
that the upturned end 200 of retarding lever 199
can be set to engage pin 61 immediately after
curtain winding gear 52 has been released, thus
providing the longest shutter opening. If re-
tarding lever 199 is so positioned that pin 61
barely contacts with the upturned end 200, thus
moving lever 199 only slightly, a very short re-
tardation of curtain winding gear 52 will take
place.

Any one of the intermediate speeds is provided
for by the series of holes 105 in the cam plate
54, thus providing any pre-selected time lag be-
tween the instant the first curtain 35 is released
and the instant the second curtain 35A is re-
leased. After pin 61 has passed said upturned
end 200 of the retarding lever 199, said lever with
its upturned end 200 is then returned to the
starting position under the influence of spring
209. When the retarding lever 199 is in posi-
tion for the longest exposure, it will be in the
position shown in dotted lines, Figs. 8 and 16.
When the slow shutter speed control finger 26 is
set for "instantaneous," said retarding lever 199
and its upturned end 200 will be in the position
shown in Fig. 27, so that pin 61 does not contact
with upturned end 200 as curtain winding gear
52 and the second curtain 35A is allowed to run
down. Thus no retarding action is provided at
such time.

The operation of the several slow shutter
speeds is exactly the same as for an instantane-
ous exposure excepting that either index 106 or
shutter knob 25 is set to the position 25—S on
shutter setting dial 102 and the slow shutter
speed finger 26 is set to the speed desired. The
button 22 is released in the usual manner for
making an exposure.

The mirror frame 149 swings up and causes
the first curtain 35 to be released in the same
manner as for instantaneous exposure. As said
first curtain 35 runs down, pin 104 contacts with
arm 122, thereby disengaging dog 183 from the 6. Just prior to this, the shaft 202, was under the influence of cam face 218 and 213, so that the upturned end 200 was fit in position in front of pin 61, and so even though the second curtain winding 52 of the second curtain 35A was released, gear 52 cannot rotate until it has caused ling lever 199 to move out of the path of

*Film feeding and shutter interlock.*—The film ing and shutter interlock mechanism will be described. To load the camera, a film cartridge of standard manufacture is placed in film chamber 47 (Fig. 2) over shaft end 43 and shaft key 44. The of the cartridge is held central with stud mounted on a spring hinge (not shown). An empty spool is placed in take-up film chamber in a similar manner, and the film on the spool in chamber 47 is led across the back of the camera and engaged with the spool in take-up chamber 48. The cover 238 is then replaced. structure of the film chambers is most clearly shown in Fig. 29; the take-up chamber only is there shown. The take-off chamber is of similar construction. The film spool flange is shown at 239. The film spool is, of course, provided with flanges on both sides of the film strip. film spool core is shown at 240 and the film is passing over an idler 242, and across camera back plate 243 riveted to the film chamber housing 34 by rivets 244. The film chamber housing is also connected to the camera using 20 by screws 245. Attached to the film using is a pressure spring 246 held in place by its 247, 247 attached to the camera cover is a spring 248 by means of rivets 249. The purpose of said spring 248 is to hold a pressure be 250 in contact with the film strip 241. The pressure plate 250 is held to spring 248 by shoulder rivet 251. The camera back cover 238 provided with the usual slide locks designated 23 in several of the figures, particularly Figs. and 29. As previously stated, the structure of other half of the camera is not shown in Fig. but is substantially the same.

It was previously pointed out that as lever 24 (Fig. 1) is rocked forward and back, the film 241 caused to wind up on the film spool core 240 the same time that the shutter is rewound and that it is necessary to continue winding film even though the shutter is completely wound, so to advance the film a sufficient distance to pose a new surface thereof for the exposure ening, and when sufficient film has been advanced, forward motion of lever 24 is arrested. will now describe the means for doing this. As clearly shown in Fig. 35, the shaft 43 has a key 44 onto which the take-up spool is fitted. aid shaft 43 passes through the camera casting and has a pinion 252 attached thereto. Under id pinion 252 is a spacing washer 253, and the nion 252 has a knurled surface 254 pressed to a hole in shaft 43. Said pinion 252 meshes with a gear 255 which has a pinion 256 forming hub on gear 255. A washer 257 is riveted to nion 256, thus forming a short hub at the nder side of gear 255, which rotates around a haft 256a fastened into the casting 92 and prevented from turning therein by a knurled portion 258. Said pinion 256 meshes with a gear 259 having a hub 260. On the upper surface of aid gear hub 260 is placed an index plate 262. A shaft 261 with a reduced end 263 passes through a hole in the index plate 262 and a hole in gear 259 and is riveted thereto, thus holding gear 259, index plate 262 and shaft 261 as an integral unit. The upper end of said shaft 261 is provided with flats 264, 264 over which the knob 30 is fitted, it having a hole so shaped as to fit the said shaft flats 264, 264. The knob 30 is held in place by a filister head screw 265. The measuring mechanism cover 19 is provided with a hub 266 through which shaft 261 passes.

A spring 267a rides in a slot over hub 265a and presses downwardly onto index plate 262. This structure provides means for setting index plate 262 at any predetermined point by raising knob 30, thus disengaging gear 259 from pinion 256, and allowing knob 30 to be turned together with index plate 262. Said index plate 262 is provided with a series of notches 266, 266, most clearly shown in Fig. 32. These notches are provided with numbers from 1 to 12, each representing an exposure area on the film. At the position of each notch is a turned-down portion 267, most clearly shown in Fig. 36 and in detail in Figs. 33 and 34.

On the shoulder screw 97 (Figs. 32, 37, 38) is pivoted a lever 268 having a hole 269 and also having an upturned end 270 (Figs. 33, 34). To the under side of lever 268 is secured by rivet 272 a spring 271 which is provided with a clearance hole to clear the bushing 99a (Fig. 36). The forward end of spring 271 is prevented from moving laterally by means of a pin 273 (Figs. 36, 37, 38) passing through a hole in spring 271, which is allowed to move downward away from lever 268 when riding over turned-down portions 267. Said spring 271 is provided with an extending lip 274, Fig. 37, also shown in dotted lines in Fig. 38. Through the hole 269 of the lever 268 passes an upturned end of an elongated, rod-like, connecting member 275, which passes across the back of the camera and is threaded into a bushing 276 of the locking plate 277, as most clearly shown in Figs. 32 and 36. Said locking plate 277 is provided with a slot 278 through which the shoulder screw 184 passes, and with a second slot 279 through which shoulder screw 280 passes. Said locking plate 277 is free to slide horizontally under the control of lever 268 and pin 128 of the rocking member 126. As shown in Fig. 9, the locking pin 128 is in such a position that it is about to move locking plate 277 to the right. The latter is provided with an extending arm having a point 281 which engages ratchet 123 as shown in Fig. 9, wherein locking plate 277 has been moved all the way to the left, thus causing point 281 thereof to engage teeth of ratchet 123. Said locking plate 277 has been caused to move to the left under the influence of spring 282, shown in Fig. 32, which has caused lever 268 to move in a clockwise direction and upturned end 270 has entered the No. 1 slot of the index plate 262. The motion of lever 268 is transmitted to the locking plate 277 by said connecting member 275, as most clearly shown in Fig. 32. The ratchet 123 is now locked and is prevented from turning in a clockwise direction. A dog 283, shown in Fig. 9, is provided to prevent ratchet 123 from turning in a contraclockwise direction. Said dog 283 is pivoted on a stud 284, having nut 286 to hold it in place, and is caused to move in a clockwise direction under the influence of a spring 285.

*The operation of the measuring device.*—After having placed a spool of film in the supply chamber and threaded the film onto the empty spool in the take-up chamber and the camera back is replaced, the shutter release button 22 ed, causing locking member 277 to be o the right in a manner previously de-
This will cause connecting member 275 so moved to the right and lever 268 to g in a contraclockwise direction, thus ing upturned end 270 from any one of 266 in which it may be engaged. The is then raised and turned until zero 287 (Fig. 37) on index plate 262 ap- ider hole 29 in plate 19 (Fig. 1). The can now be operated until No. 1 on film pears under the ruby window (not in the camera back cover 238. When the film appears, knob 30 is again raised eral No. 1 of index plate 262 is placed ep hole 29 in plate 19. The camera position for making the first exposure. ver 24 is operated, the shutter is re- nd the mirror is reset. It has just been how the first exposure area of the film out in position for the first exposure. hanism will now be positioned as in wherein the upturned end 270 of the will be in notch 226 opposite the nu- 1, and locking plate 277 having the will engage one of the teeth of ratchet is no further winding or operation of (Fig. 1) in a clockwise direction can e until after an exposure is made.
ing an exposure, button 22 is pressed, the mirror frame 149, and allowing the o operate. At the same time, button sed, the locking plate 277 is moved to in the manner previously described, ng the upturned end 270 of lever 268 266 and dog 281 from the ratchet 123. g end 274 underlies one of the turned- s 267, as shown in Fig. 35. When the ate 277 was moved to the right, the g member 275 was also moved to the nging lever 268 in a contraclockwise withdrawing the upturned end 270 266, and pulling spring end 274 past rned lip 267. The spring end 274 then the position shown in Fig. 33, holding ied end 270 from engaging in slot 266 umeral No. 1, and thus holding the ate 277 from engagement with the 3. The winding lever 24 can now be which will cause some film strip to upon the take-up spool, and the shut- rewound and the mirror reset. Since spool will drive shaft 43 through key tion 252 will be caused to rotate, ro- 255, pinion 256 and gear 259, which to index plate 262, until numeral No. es the peep hole 29. Since the down- 267 is provided with an angular face tion of rotation, the said lip will over- 274, forcing it downward, thus allow- turned end 270 to drop into slot 266 x plate 262 when sufficient film has l to cause the said index plate to turn When the said upturned end 270 slot 266 opposite numeral No. 2, the ill rotate in a clockwise direction un- luence of spring 282, thrusting con- mber 275 to the left. The locking l will also be moved to the left, car- it pointed end 281 into engagement the teeth of ratchet 123, thus pre- ther movement in a clockwise direc- said winding lever 24.
clearly seen that in this construction xposure is impossible, because the shutter cannot be operated until it is rewound and the act of rewinding the shutter also positions a new film supply behind the exposure opening. After sufficient film has been so positioned, no more film can be moved until a second exposure is made. The notches 266 in the index plate 262 are not equally spaced, but are spaced at varying distances so as to compensate for the changed diameter of the film supply spool. Thus an equal amount of film is fed off the supply spool each time the notch 266 is allowed to pass the upturned end 270.

After the twelfth exposure has been made, spring end 274 (Figs. 37, 38) will hold the upturned end 270 in position to be led onto the solid portion 288 of the index plate 262, thus permitting the winding off of the remaining film and trailer that is still on the take-off spool, by the operation of film winding lever 24.

Having thus described one illustrative embodiment of the invention, it is to be understood that although specific terms are employed, they are used in a generic and descriptive sense and not for purposes of limitation, the scope of the invention being set forth in the following claims.

I claim:

1. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain winding shaft to engage said second lever arm on one side to drive it in the engaging direction for resetting the mirror frame when the curtain is rewound, and a third lever co-axially pivoted with said other two lever arms and having a part extending into position to be engaged by shutter release means, another part engaging the mirror frame to hold it in set position, said spring means permitting the second lever to be engaged by the other side of the helical cam and to be driven in the non-engaging direction until it passes over the cam, whereupon the spring means places the lever in position to be driven by the first cam side to set the mirror.

2. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain-winding shaft to engage said second lever arm on one side to drive it in the engaging direction for resetting the mirror frame when the curtain is rewound, said spring means permitting the second lever to be engaged by the other side of the helical cam and be driven in the non-engaging direction until passes over the cam, whereupon the spring ans places the lever in position to be driven the first cam side to set the mirror.

3. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain-winding shaft to engage said second lever arm on one side to drive it in the engaging direction for resetting the mirror frame when the curtain is rewound, a third lever co-axially pivoted with said other two lever arms and having a part extending into position to be engaged by shutter release means, another part engaging the mirror frame to hold it in set position, a movable release member, a lever engaging with and moved by movement of said release member, said last mentioned lever being positioned to engage said third lever, thereby to swing said lever and to disengage the mirror frame and permit the movement thereof into picture-taking position, said spring means permitting the second lever to be engaged by the other side of the helical cam and to be driven in the non-engaging direction until it passes over the cam, whereupon the spring means places the lever in position to be driven by the first cam side to set the mirror.

4. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain-winding shaft to engage said second lever arm on one side to drive it in the engaging direction for resetting the mirror frame when the curtain is rewound, a third lever co-axially pivoted with said other two lever arms and having a part extending into position to be engaged by shutter release means, another part engaging the mirror frame to hold it in set position, a movable release member, a bell crank lever positioned to be engaged and moved by said release member and thereupon to engage said third mentioned lever, and thereby swing said lever upon said common pivot so as to release the mirror frame, said spring means permitting the second lever to be engaged by the other side of the helical cam and to be driven in the non-engaging direction until it passes over the cam, whereupon the spring means places the lever in position to be driven by the first cam side to set the mirror.

5. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain-winding shaft to engage said second lever arm on one side to drive it in the engaging direction for resetting the mirror frame when the curtain is rewound, a third lever co-axially pivoted with said other two lever arms and having a part extending into position to be engaged by shutter release means, another part engaging the mirror frame to hold it in set position, a movable release button, two bell crank levers both positioned to be engaged and moved by said release button, one of said bell crank levers being positioned to engage and move said third mentioned lever so as to release the mirror frame, said spring means permitting the second lever to be engaged by the other side of the helical cam and to be driven in the non-engaging direction until it passes over the cam, whereupon the spring means places the lever in position to be driven by the first cam side to set the mirror, a bulb-operating rocker plate, the second of said bell crank levers being positioned to engage and move said rocker plate, and a gear pivot-plate engageable with and adapted to be moved by movement of said rocker plate, a curtain winding gear, and a pinion carried by said pivot-plate, engageable and disengageable with and from said winding gear upon movement of said rocker plate and pivot-plate.

6. In a photographic camera of the reflex type having a casing, an objective lens, a pivoted mirror frame, a shutter-curtain winding shaft having a winding gear, said shaft having a cam formation, and means for resetting the mirror by the winding movement of said shaft, including a projection extending from the mirror frame, a pivoted reset-lever arm engaging said projection from the mirror frame, a second lever arm pivoted co-axially with said reset-lever arm and engaging said arm in one direction of rotation, spring means to press the second lever arm toward said reset-lever arm in the engaging direction, a mirror reset partial helical cam formation upon said curtain-winding shaft to engage said second lever arm on one side to drive it in the engaging direction for resetting the mirror frame when the curtain is rewound, a third lever co-axially pivoted with said other two lever arms and having a part extending into position to be engaged by shutter release means, another part engaging the mirror frame to hold it in set position, a movable release button, two bell crank levers both positioned to be engaged and moved by said release button, one of said bell crank levers being positioned to engage and move said third mentioned lever so as to release the mirror frame, said spring means permitting the second lever to be engaged by the other side of the helical cam and to be driven in the non-engaging direction until it passes over the cam, whereupon the spring means places the lever in position to be driven by the first cam side to set the mirror, a bulb-operating rocker plate concentrically positioned with respect to the film-windshaft, a spring tending to turn said rocker
e in one direction, said second mentioned bell
ık lever being positioned to engage said
er plate, and means controlled by movement
aid rocker plate to disengage the curtain-
ling gear.

In a photographic camera of the reflex type
ng a casing, an objective lens, a pivoted
or frame, a shutter-curtain winding shaft
ng a winding gear, said shaft having a cam
ation and means for resetting the mirror
ıe winding movement of said shaft, including
ojection extending from the mirror frame, a
ted reset-lever arm engaging said projection
ı the mirror frame, a second lever arm
ted co-axially with said reset-lever arm and
ging said arm in one direction of rotation,
ıg means to press the second lever arm to-
l said reset-lever arm in the engaging rota-
a mirror reset partial helical cam forma-
upon said curtain-winding shaft to engage
second lever arm on one side to drive it in
engaging direction for resetting the mirror
e when the curtain is rewound, a third lever
xially pivoted with said other two lever arms
having a part extending into position to be
ged by shutter release means, a movable re-
button, two bell crank levers both positioned
engaged and moved by said release button,
of said bell crank levers being positioned to
ge and move said third mentioned lever so
release the mirror frame, said spring means
itting the second lever to be engaged by the
side of the helical cam and to be driven
e non-engaging direction until it passes over
am, whereupon the spring means places the
in position to be driven by the first cam
to set the mirror, a bulb-operating rocker
, said second bell crank lever engageable
said rocker plate, spring means tending to
said rocker plate in one direction, a curtain-
ng gear, and a pinion adapted to be moved
ovement of said rocker plate into and out of
ing relation with said curtain-winding gear.

n a photographic camera of the reflex type
g a casing, an objective lens, a pivoted
r frame, a shutter-curtain winding shaft
g a winding gear, said shaft having a cam
ıtion and means for resetting the mirror by
'inding movement of said shaft, including
jection extending from the mirror frame, a
:d reset-lever arm engaging said projection
the mirror frame, a second lever arm pivoted
ially with said reset-lever arm and engaging
arm in one direction of rotation, spring
; to press the second lever arm toward said
lever arm in the engaging direction, a mir-
set partial helical cam formation upon said
n-winding shaft to engage said second lever
n one side to drive it in the engaging direc-
or resetting the mirror frame when the
n is rewound, a third lever co-axially
d with said other two lever arms and hav-
part extending into position to be engaged
ıtter release means, another part engaging
ırror frame to hold it in set positions, a
r release lever, said first mentioned lever
tuting the mirror reset arm, having an ex-
ı 115 adapted for operating engagement, a
n winding gear, and a lever 110 having a
tion to engage said curtain winding gear
1 it from rotation and itself adapted to be
:d by said extension 115 of said mirror
arm, said spring means permitting the
lever to be engaged by the other side of the helical cam and to be driven in the non-
engaging direction until it passes over the cam,
whereupon the spring means places the lever in
position to be driven by the first cam side to set
the mirror.

9. In a photographic camera of the reflex type
having a casing, an objective lens, a pivoted mir-
ror frame, a shutter-curtain winding shaft having
a winding gear, said shaft having a cam forma-
tion and means for resetting the mirror by the
winding movement of said shaft, including a
projection extending from the mirror frame, a
pivoted reset-lever arm engaging said projection
from the mirror frame, a second lever arm
pivoted co-axially with said reset-lever arm and
engaging said arm in one direction of rotation,
spring means to press the second lever arm to-
ward said reset-lever arm in the engaging di-
rection, a mirror reset partial helical cam forma-
tion upon said curtain-winding shaft to engage
said second lever arm on one side to drive it in
the engaging direction for resetting the mirror
frame when the curtain is rewound, a third lever
co-axially pivoted with said other two lever arms
and having a part extending into position to be
engaged by shutter release means, another part
engaging the mirror frame to hold it in set posi-
tion, a curtain-winding gear, means under the
control of said shutter release means to hold
said winding gear from rotation, the said cam
formation of the shutter-curtain winding shaft
acting as a snubber to the first curtain because
of the said spring means pressing the second
mentioned lever arm toward the reset-lever arm,
said spring means permitting the second lever
to be engaged by the other side of the helical cam
and to be driven in the non-engaging direction
until it passes over the cam, whereupon the
spring means places the lever in position to be
driven by the first cam side to set the mirror.

10. In a photographic camera of the reflex type
having a casing, an objective lens, a pivoted mir-
ror frame, a shutter-curtain winding shaft hav-
ing a winding gear, said shaft having a cam
formation and means for resetting the mirror by
the winding movement of said shaft, including a
projection extending from the mirror frame, a
pivoted reset-lever arm engaging said projection
from the mirror frame, a second lever arm
pivoted co-axially with said reset-lever arm and
engaging said arm in one direction of rotation,
spring means to press the second lever arm to-
ward said reset-lever arm in the engaging di-
rection, a mirror reset partial helical cam forma-
tion upon said curtain-winding shaft to engage
said second lever arm on one side to drive it in
the engaging direction for resetting the mirror
frame when the curtain is rewound, a third lever
co-axially pivoted with said other two lever arms
and having a part extending into position to be
engaged by shutter release means, another part
engaging the mirror frame to hold it in set posi-
tion, the second mentioned lever arm having a
lateral projection engageable with the cam for-
mation upon the shutter-curtain winding shaft,
the said cam formation acting in its movement
to reise said lateral projection to a point over
said cam formation, and thereby permit subse-
quent downward movement of said lateral projec-
tion and the lever carried thereby, said spring
means permitting the second lever to be engaged
by the other side of the helical cam and to be
driven in the non-engaging direction until it
passes over the cam, whereupon the spring means the lever in position to be driven by the m side to set the mirror.

n a photographic camera of the reflex type a casing, an objective lens, a pivoted mirme, a shutter-curtain winding shaft having winding gear, said shaft having a cam ion and means for resetting the mirror by iding movement of said shaft, including a ion extending from the mirror frame, a l reset-lever arm engaging said projection the mirror frame, a second lever arm l co-axially with said reset-lever arm and ng said arm in one direction of rotation, means to press the second lever arm toaid reset-lever arm in the engaging direcmirror reset partial helical cam formapon said curtain-winding shaft to engage :cond lever arm on one side to drive it in gaging direction for resetting the mirror when the curtain is rewound, a third lever ally pivoted with said other two lever arms iving a part extending into position to be :d by shutter release means, another part ng the mirror frame to hold it in set posiaid shutter-curtain winding shaft with its ormation having an upright position in the a casing, said second mentioned lever arm ; a lateral projection with which said for1 engages, and the construction of parts such that in the rotation of the curtainig shaft the said cam formation elevates :st and second mentioned lever arms, and ermits their downward movement to effect of the mirror frame to its down or focusing on, said spring means permitting the second to be engaged by the other side of the l cam and to be driven in the non-engaging ion until it passes over the cam, whereupon oring means places the lever in position to ven by the first cam side to set the mirror.

A combination according to claim 1, but in the said mirror reset lever arm is pro1 sufficiently so as to engage in its movethe first curtain release member when the nirror frame is swung all the way up.

A combination according to claim 1, but in l the said reset lever arm is provided with a 175 adapted to engage in its movement an 176 of the shutter release lever 110, when tid mirror frame is swung all the way up.

A combination according to claim 2, but in 1 the mirror reset lever arm is sufficiently nged to engage in its movement the first in release member when the mirror frame ing all the way up.

A photographic camera having in combinaa casing provided with an objective lens, a or swingingly mounted in said casing, mireleasing means, shutter mechanism includwo sliding curtains, a first curtain release , each curtain provided with a winding gear ig co-acting, relatively adjustable pins, a whereon said winding gears are respectively and loose, a shutter setting knob 25 upon shaft having a pin, and a cam fast with one aid winding gears and having formations geable by said pin, and a curtain release , said cam having a formation to be engaged aid lever, said curtain release lever being l upon by said mirror near the end of its el in an upright direction to disengage said iin release lever from said cam formations.

A photographic camera having in combinaa casing provided with an objective lens, a or swingingly mounted in said casing, mirror releasing means, shutter mechanism including two sliding curtains, a first curtain release lever, each curtain provided with a winding gear having co-acting, relatively adjustable pins, a shaft 63 whereon said winding gears are respectively fast and loose, a shutter setting knob 25 having pin 104, and a cam fast with one of said winding gears, said cam having a series of holes 105 in which said pin is positionable, and also having a formation to be engaged by the first curtain release lever, said curtain release lever being acted on by said swinging mirror near the end of its travel in an upward direction to disengage said curtain release lever from said cam formation.

17. A photographic camera having in combination, a casing provided with an objective lens, a mirror swingingly mounted in said casing, mirror releasing means, shutter mechanism including two sliding curtains, a first curtain release member, each curtain provided with a winding gear having co-acting, relatively adjustable pins, a shaft 63 whereon said winding gears are respectively fast and loose, a shutter setting knob 25 having pin 104, a cam fast with one of said winding gears, said cam having a series of holes 105 in which said pin is positionable, and having a formation to be engaged by said release member, said curtain release member being acted on by said swinging mirror near the end of its travel in an upward direction to disengage said curtain release lever from said cam formation, and a shutter dial 102 mounted upon the upper end of said shaft whereby said shaft may be turned for resetting the shutter.

18. A photographic camera having an objective lens, means for supporting a film, a shutter consisting of two sliding curtains, and curtain and film operating means including curtain winding gears 50, 52, a shaft 63 whereon they are mounted, cam member 68 on said shaft having a cam formation 164, and co-acting means engageable with said cam formation 164 and spring pressed thereagainst with increasing spring pressure in the operation of the parts, whereby said cam formation acts as a snubber or cushion for said first curtain.

19. A photographic camera having a casing provided with an objective lens, a swinging mirror mounted in said casing, holding means for said mirror, a shutter consisting of two sliding curtains, curtain winding gears therefor, curtain rewind gears therefor, gear plate 115 carrying said rewind gears, release button 22, bell crank levers 171, 172 positioned to be operated by movement of said release button, said bell crank lever 171 being so positioned as to release said mirror when so operated, rocker plate 126 positioned to operate said gear plate 115 when the latter is so moved by said bell crank lever 172, second-curtain release lever 181 positioned to be operated by said rocker plate 126, first-curtain cam plate 154, and first-curtain release lever 110 engageable with said cam plate 54 to hold the said shutter in set position, said lever 110 being so located as to be operated by the released movement of said swinging mirror to cause shutter operation.

20. A photographic camera having an objective lens, means for supporting a film, a shutter consisting of two sliding curtains, and curtain and film operating means including shutter release knob 22, bell cranks 171, 172, both positioned to be directly engaged and operated by said release knob, said bell crank 171 being positioned for operating a movable mirror, and bell crank 172 being positioned to control the curtain mechanism, curtain winding gears 50, 52, second curtain release lever 181 engageable with the second curtain winding gear, and means co-acting with said bell crank 172 to allow said second curtain to close.

21. A photographic camera having an objective lens, means for supporting a film, a shutter consisting of two sliding curtains, and curtain and film operating means including shutter release knob 22, bell cranks 171, 172, both positioned to be directly engaged and operated thereby, said bell crank 171 being positioned for operating a movable mirror, and bell crank 172 being positioned to control the curtain mechanism, winding gear 50 for the first curtain, winding gear 52 for the second curtain, second curtain release lever 181 and shutter release pin 60 on curtain winding gear 52.

22. A photographic camera having an objective lens, means for supporting a film, a shutter consisting of two sliding curtains, and curtain and film operating means including shutter release knob 22, bell cranks 171, 172, both positioned to be directly engaged and operated thereby, said bell crank 171 being positioned for operating a movable mirror, and bell crank 172 being positioned to control the curtain mechanism, first curtain winding gear 50 having cam plate 54, second curtain winding gear 52 having shutter release pin 60, and second curtain release lever 181 having a formation to engage said pin 60.

23. A photographic camera having an objective lens, means for supporting a film, a shutter consisting of two sliding curtains, and curtain and film operating means including shutter release knob 22, bell cranks 171, 172, both positioned to be directly engaged and operated thereby, said bell crank 171 being positioned for operating a movable mirror, and bell crank 172 being positioned to control the curtain mechanism, first curtain winding gear 50 having cam plate 54, second curtain winding gear 52 having shutter release pin 60, second curtain release lever 181 having a formation to engage said pin 60, and first curtain release lever 110 having a formation to engage said cam plate 54.

24. A photographic camera having an objective lens, means for supporting a film, a shutter consisting of two sliding curtains, and curtain and film operating means including shutter release knob 22, bell cranks 171, 172, both positioned to be directly engaged and operated thereby, said bell crank 171 being positioned for operating a movable mirror, and bell crank 172 being positioned to control the curtain mechanism, first and second curtain release levers 110, 181, a rocker arm 126 engageable with bell crank lever 172 and having cooperating spring 132, whereby release lever 181 is moved to allow the second curtain to close.

25. A photographic camera having an objective lens, means for supporting a film, a shutter consisting of two sliding curtains, and curtain and film operating means including shutter release knob 22, bell cranks 171, 172, both positioned to be directly engaged and operated thereby, said bell crank 171 being positioned for operating a movable mirror, and bell crank 172 being positioned to control the curtain mechanism, first and second curtain release levers 110, 181, first curtain winding gear 50, a rocker arm 126 engageable with said second curtain release lever and with said bell crank 172, and having cooperating spring 132, whereby release lever 181 is moved to allow the second curtain to close, and pivot plate 115 engageable with said rocker plate 126 having gear 112 to mesh with the first curtain winding gear 50.

26. A combination according to claim 19, in which a movable member 167 is interposed between said bell crank lever 171 and the said mirror, to release the latter upon movement of said bell-crank lever 171.

EDSON S. HINELINE.